US012526832B2

(12) United States Patent
Zhang et al.

(10) Patent No.: US 12,526,832 B2
(45) Date of Patent: Jan. 13, 2026

(54) INTERFERENCE MITIGATION FOR FULL-DUPLEX NETWORK ENTITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 17/750,684

(22) Filed: May 23, 2022

(65) Prior Publication Data

US 2023/0379956 A1 Nov. 23, 2023

(51) Int. Cl.
H04W 72/542 (2023.01)
H04L 5/00 (2006.01)
H04W 72/566 (2023.01)

(52) U.S. Cl.
CPC ......... H04W 72/542 (2023.01); H04L 5/0035 (2013.01); H04L 5/0037 (2013.01); H04L 5/0092 (2013.01); H04W 72/569 (2023.01)

(58) Field of Classification Search
None
See application file for complete search history.

(56) References Cited

U.S. PATENT DOCUMENTS

| | | | | |
|---|---|---|---|---|
| 2008/0070586 A1* | 3/2008 | Kermoal | ............... | H04W 16/04 455/452.2 |
| 2009/0130980 A1* | 5/2009 | Palanki | ............... | H04W 52/325 455/63.1 |
| 2009/0131065 A1* | 5/2009 | Khandekar | ......... | H04W 72/541 455/67.13 |
| 2009/0197588 A1* | 8/2009 | Khandekar | ......... | H04W 72/541 455/63.1 |
| 2009/0197629 A1* | 8/2009 | Borran | ................... | H04W 52/34 455/522 |
| 2009/0197631 A1* | 8/2009 | Palanki | ................. | H04W 72/21 455/63.1 |
| 2009/0227263 A1* | 9/2009 | Agrawal | ............... | H04W 16/16 455/63.1 |
| 2010/0097963 A1* | 4/2010 | Astely | ................. | H04W 72/542 370/280 |
| 2011/0051711 A1* | 3/2011 | Kishiyama | ............ | H04L 5/0092 370/350 |
| 2012/0257574 A1* | 10/2012 | Seok | ................... | H04W 72/541 370/328 |

(Continued)

Primary Examiner — Otis L Thompson, Jr.
(74) Attorney, Agent, or Firm — Holland & Hart LLP

(57) ABSTRACT

Methods, systems, and devices for wireless communication are described. Two network entities may experience coexistence interference due to operating on a same channel or adjacent channels based on at least one of the network entities operating in a full-duplex mode. A first network entity may indicate, to the half-duplex network entity, an interference mitigation action to be performed for a duration of transmission time intervals. The interference mitigation action may include adjusting the power of downlink communications from the one of the network entities which overlap in bandwidth with uplink communications at the full-duplex network entity, muting a subband for a downlink communication, or configuring a larger guard band between operating channels.

30 Claims, 12 Drawing Sheets

(56) References Cited

U.S. PATENT DOCUMENTS

| | | | |
|---|---|---|---|
| 2017/0034790 A1* | 2/2017 | Lopez-Perez | H04W 52/244 |
| 2018/0375703 A1* | 12/2018 | Kellogg | H04L 27/34 |
| 2019/0036559 A1* | 1/2019 | Wu | H04L 5/0091 |
| 2019/0342057 A1* | 11/2019 | Rico Alvarino | H04W 72/52 |
| 2020/0008230 A1* | 1/2020 | Yu | H04L 5/0055 |
| 2020/0221392 A1* | 7/2020 | Xue | H04W 16/14 |
| 2020/0235980 A1* | 7/2020 | Wilson et al. | H04L 5/0014 |
| 2021/0058221 A1* | 2/2021 | Taneja | H04L 5/1461 |
| 2021/0152320 A1* | 5/2021 | Sundararajan | H04W 72/0473 |
| 2021/0328749 A1* | 10/2021 | Barac | H04L 5/0073 |
| 2022/0322370 A1* | 10/2022 | Yu | H04W 72/20 |
| 2022/0400492 A1* | 12/2022 | Huang | H04W 72/541 |
| 2023/0164701 A1* | 5/2023 | Fakoorian | H04L 5/0053 455/522 |
| 2023/0309062 A1* | 9/2023 | Zhang | H04W 72/0446 |

* cited by examiner

INTERFERENCE MITIGATION FOR FULL-DUPLEX NETWORK ENTITY

FIELD OF TECHNOLOGY

The following relates to wireless communication, including interference mitigation for full-duplex network entity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support interference mitigation for full-duplex network entity. For example, the described techniques provide for one or more full-duplex network entities supporting neighboring cells and techniques to mitigate interference for communications with one or more user equipments (UE) operating in the neighboring cells. A first network entity may receive an indication that communications in a first channel with a first UE is subject to interference caused by communications by a second network entity in a second channel with a second UE. The first UE may transmit a request to the second UE, and the request may indicate that the second UE is to perform an interference mitigation action for the communication with the second UE. The interference mitigation action may be that the second UE is to mute transmission (e.g., not transmit) on a subband, to reduce transmission power on a subband, or use a large gap band for a channel. The first network entity may communicate with the first UE during one or more transmission time intervals based on transmitting the request.

A method is described. The method may include receiving, based on at least one of the first network entity and a second network entity operating in a full duplex mode, an indication that a first communication with a first user equipment (UE) by the first network entity in a first channel is subject to interference by a second communication by the second network entity with a second UE in a second channel that is adjacent to or overlaps with the first channel in a frequency domain, transmitting, in response to receiving the indication, signaling including a request that the second network entity is to perform an interference mitigation action for the second communication with the second UE during one or more transmission time intervals, and communicating with the first UE during the one or more transmission time intervals based on transmitting the signaling including the request.

An apparatus is described. The apparatus may include a processor, a memory coupled with the processor, with instructions stored in the memory. The instructions are executable by the processor to cause the apparatus to receive, based on at least one of the first network entity and a second network entity operating in a full duplex mode, an indication that a first communication with a first UE by the first network entity in a first channel is subject to interference by a second communication by the second network entity with a second UE in a second channel that is adjacent to or overlaps with the first channel in a frequency domain, transmit, in response to receiving the indication, signaling including a request that the second network entity is to perform an interference mitigation action for the second communication with the second UE during one or more transmission time intervals, and communicate with the first UE during the one or more transmission time intervals based on transmitting the signaling including the request.

Another apparatus is described. The apparatus may include means for receiving, based on at least one of the first network entity and a second network entity operating in a full duplex mode, an indication that a first communication with a first UE by the first network entity in a first channel is subject to interference by a second communication by the second network entity with a second UE in a second channel that is adjacent to or overlaps with the first channel in a frequency domain, means for transmitting, in response to receiving the indication, signaling including a request that the second network entity is to perform an interference mitigation action for the second communication with the second UE during one or more transmission time intervals, and means for communicating with the first UE during the one or more transmission time intervals based on transmitting the signaling including the request.

A non-transitory computer-readable medium storing code is described. The code may include instructions executable by a processor to receive, based on at least one of the first network entity and a second network entity operating in a full duplex mode, an indication that a first communication with a first UE by the first network entity in a first channel is subject to interference by a second communication by the second network entity with a second UE in a second channel that is adjacent to or overlaps with the first channel in a frequency domain, transmit, in response to receiving the indication, signaling including a request that the second network entity is to perform an interference mitigation action for the second communication with the second UE during one or more transmission time intervals, and communicate with the first UE during the one or more transmission time intervals based on transmitting the signaling including the request.

In some examples of the method, apparatuses, and non-transitory computer-readable medium described herein, transmitting the signaling may include operations, features, means, or instructions for transmitting an indication that the first network entity may be to receive the first communication that may be associated with a high priority during the one or more transmission time intervals.

In some examples of the method, apparatuses, and non-transitory computer-readable medium described herein, receiving the indication may include operations, features, means, or instructions for receiving, from the first UE, signaling indicating that a prior communication by the second network entity interferes with a prior communication by the first network entity, where the signaling indicating the request may be transmitted based on receiving the signaling.

In some examples of the method, apparatuses, and non-transitory computer-readable medium described herein, transmitting the signaling may include operations, features, means, or instructions for transmitting a power backoff value or an increased guard band value to be applied to the interference mitigation action.

In some examples of the method, apparatuses, and non-transitory computer-readable medium described herein, transmitting the signaling may include operations, features, means, or instructions for transmitting the request to perform the interference mitigation action that may be that the second network entity may be to not transmit on a second subband of a of the second channel that at least partially overlaps with a first subband of the first channel that may be used for the first communication.

In some examples of the method, apparatuses, and non-transitory computer-readable medium described herein, the first subband may be an uplink subband that may be used for receipt of the first communication from the first UE and the second subband may be a downlink subband.

In some examples of the method, apparatuses, and non-transitory computer-readable medium described herein, transmitting the signaling may include operations, features, means, or instructions for transmitting the request to perform the interference mitigation action that may be that the second network entity may be to reduce a downlink transmission power of the second communication on a second subband of the second channel that at least partially overlaps with a first subband of the first channel that may be used for the first communication.

In some examples of the method, apparatuses, and non-transitory computer-readable medium described herein, the first subband may be an uplink subband that may be used for receipt of the first communication from the first UE and the second subband may be a downlink subband.

In some examples of the method, apparatuses, and non-transitory computer-readable medium described herein, the second subband includes a downlink portion of the second channel.

In some examples of the method, apparatuses, and non-transitory computer-readable medium described herein, transmitting the signaling may include operations, features, means, or instructions for transmitting the request to perform the interference mitigation action that may be that the second network entity may be to apply an interference mitigation guard band between communications in the second channel and a frequency of the first channel.

In some examples of the method, apparatuses, and non-transitory computer-readable medium described herein, the interference mitigation guard band may be associated with a first guard bandwidth that may be larger than a second guard bandwidth of a guard band that may be used for communications that may be not subject to the interference mitigation action.

In some examples of the method, apparatuses, and non-transitory computer-readable medium described herein, the first communication may be an uplink communication to be transmitted by the first UE to the first network entity and the second communication may be a downlink communication to be transmitted by the second network entity to the second UE based on either the first network entity or the second network entity operating in the full duplex mode.

In some examples of the method, apparatuses, and non-transitory computer-readable medium described herein, either the first network entity or the second network entity may be operating in a subband full duplex mode and the first communication on an uplink subband of the first channel may be subject to interference by the second communication on a downlink subband of the second channel based on either the first network entity or the second network entity operating in the subband full duplex mode.

In some examples of the method, apparatuses, and non-transitory computer-readable medium described herein, transmitting the signaling may include operations, features, means, or instructions for transmitting, to a central unit, the signaling including the request.

In some examples of the method, apparatuses, and non-transitory computer-readable medium described herein, receiving the indication may include operations, features, means, or instructions for receiving, from a central unit, the signaling including the indication.

In some examples of the method, apparatuses, and non-transitory computer-readable medium described herein, receiving the indication may include operations, features, means, or instructions for receiving, from a central unit, signaling that indicates the interference mitigation action.

Some examples of the method, apparatuses, and non-transitory computer-readable medium described herein may further include operations, features, means, or instructions for transmitting to the second network entity, an indication of the interference mitigation action that the second network entity may be to perform.

A method for wireless communication a first network entity is described. The method may include receiving, based on one of the first network entity and a second network entity operating in a full duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE and communicating with the first UE in the first channel during the one or more transmission time intervals based on receiving the signaling including the request to perform the interference mitigation action.

An apparatus for wireless communication a first network entity is described. The apparatus may include a processor, a memory coupled with the processor, with instructions stored in the memory. The instructions are executable by the processor to executable by the processor to cause the apparatus to receive, based on one of the first network entity and a second network entity operating in a full duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE and communicate with the first UE in the first channel during the one or more transmission time intervals based on receiving the signaling including the request to perform the interference mitigation action.

Another apparatus for wireless communication a first network entity is described. The apparatus may include means for receiving, based on one of the first network entity and a second network entity operating in a full duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE and means for communicating with the first UE in the first channel during the one or more transmission time intervals based on receiving the signaling including the request to perform the interference mitigation action.

A non-transitory computer-readable medium storing code for wireless communication a first network entity is described. The code may include instructions executable by a processor to receive, based on one of the first network entity and a second network entity operating in a full duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE and communicate with the first UE in the first channel during the one or more transmission time intervals based on receiving the signaling including the request to perform the interference mitigation action.

In some examples of the method, apparatuses, and non-transitory computer-readable medium described herein, receiving the signaling may include operations, features, means, or instructions for receiving an indication that the second network entity may be to receive the second communication that may be associated with a high priority during the one or more transmission time intervals, where the first network entity performs the interference mitigation action based on the second communication being associated with the high priority.

In some examples of the method, apparatuses, and non-transitory computer-readable medium described herein, receiving the signaling may include operations, features, means, or instructions for receiving an indication of a power backoff value or an increased guard band value to be applied to the interference mitigation action.

In some examples of the method, apparatuses, and non-transitory computer-readable medium described herein, communicating with the first UE may include operations, features, means, or instructions for refraining from transmitting on a first subband of the first channel that at least partially overlaps with a second subband of the second channel in accordance with the interference mitigation action.

In some examples of the method, apparatuses, and non-transitory computer-readable medium described herein, the first subband may be a downlink subband that may be used for transmission of the first communication to the first UE and the second subband may be an uplink subband part that may be to be used for receipt of the second communication by the second network entity.

In some examples of the method, apparatuses, and non-transitory computer-readable medium described herein, communicating with the first UE may include operations, features, means, or instructions for transmitting first communication on first subband of the first channel with a reduced downlink transmission power in accordance with the interference mitigation action, where the first subband at least partially overlaps with a second subband of the second channel that may be to be used for the second communication.

In some examples of the method, apparatuses, and non-transitory computer-readable medium described herein, the first subband may be a downlink subband that may be to be used for transmission of the first communication to the first UE and the second subband may be an uplink subband that may be to be used for receipt of the second communication by the second network entity.

In some examples of the method, apparatuses, and non-transitory computer-readable medium described herein, the first subband includes a downlink portion of the first channel.

In some examples of the method, apparatuses, and non-transitory computer-readable medium described herein, communicating with the first UE may include operations, features, means, or instructions for applying an interference mitigation guard band between the first communication in the first channel and a frequency of the second channel.

In some examples of the method, apparatuses, and non-transitory computer-readable medium described herein, the interference mitigation guard band may be associated with a first guard bandwidth that may be larger than a second guard bandwidth that may be used for communications that may be not subject to the interference mitigation action.

In some examples of the method, apparatuses, and non-transitory computer-readable medium described herein, the first communication may be a downlink communication to be transmitted by the first network entity and the second communication may be an uplink communication to be transmitted by the second UE to the second network entity based on either the first network entity or the second network entity operating in the full duplex mode.

In some examples of the method, apparatuses, and non-transitory computer-readable medium described herein, either the first network entity or the second network entity may be operating in a subband full duplex mode and the second communication may be to be transmitted on an uplink bandwidth part of the second channel that may be subject to interference by the second communication to be transmitted on a downlink bandwidth part of the first channel based on either the first network entity or the second network entity operating in the subband full duplex mode.

In some examples of the method, apparatuses, and non-transitory computer-readable medium described herein, receiving the signaling may include operations, features, means, or instructions for receiving, from a central unit, the signaling including the request to perform the interference mitigation action.

Some examples of the method, apparatuses, and non-transitory computer-readable medium described herein may further include operations, features, means, or instructions for receiving, from a central unit, a configuration for the interference mitigation action, where the interference mitigation action may be performed based on the configuration.

Some examples of the method, apparatuses, and non-transitory computer-readable medium described herein may further include operations, features, means, or instructions for receiving, from the first network entity, an indication of the interference mitigation action.

DETAILED DESCRIPTION

In some wireless communication systems, multiple network entities may operate according to different data communication schemes. For example, a first network entity may be configured to concurrently transmit and receive data transmissions (e.g., a full-duplex network entity) and a second network entity may be configured to transmit and receive data transmissions over different frames (e.g., a half-duplex network entity). In some cases, the first network entity and the second network entity may operate on the same channel (e.g., co-channel network entities) or different but adjacent channels (e.g., adjacent channel network entities), which may result in coexistence interference between the network entities. For example, if a half-duplex network entity is transmitting downlink data, a co-existing full-duplex network entity may experience interference from the downlink transmission.

In some cases, a first network entity operating in a full-duplex mode may indicate, to a co-existing second network entity operating in a half-duplex mode, an interference mitigation action to suppress interference between the network entities. In some examples, the interference mitigation action may include muting overlapping bandwidths or subbands between the network entities, reducing the power of transmissions having similar center frequencies, configuring a larger guard band between channels, or any combination thereof. In some cases, the first network entity may indicate an urgent or high-priority traffic pattern for transmissions in a number of upcoming slots (e.g., N slots) or transmission time intervals (TTIs), such that the second network entity performs interference mitigation during the indicated slots or TTIs. Additionally, or alternatively, the first network entity may measure an interference level received from the second network entity, and may indicate more specific interference mitigation recommendations based on the interference level. For example, the interference mitigation recommendation may indicate explicit values for power backoff or guard band expansion, or may recommend muting transmissions due to significant interference levels with urgent or high priority communications.

Aspects of the disclosure are initially described in the context of wireless communications systems. Aspects of the disclosure are further described with respect to a wireless communications system illustrating co-existing network entities, interference mitigation actions demonstrated by resource diagrams, and a process flow diagram. Aspects of the disclosure are further illustrated by and described herein with reference to apparatus diagrams, system diagrams, and flowcharts that relate to interference mitigation for full-duplex network entity.

Figure 1:
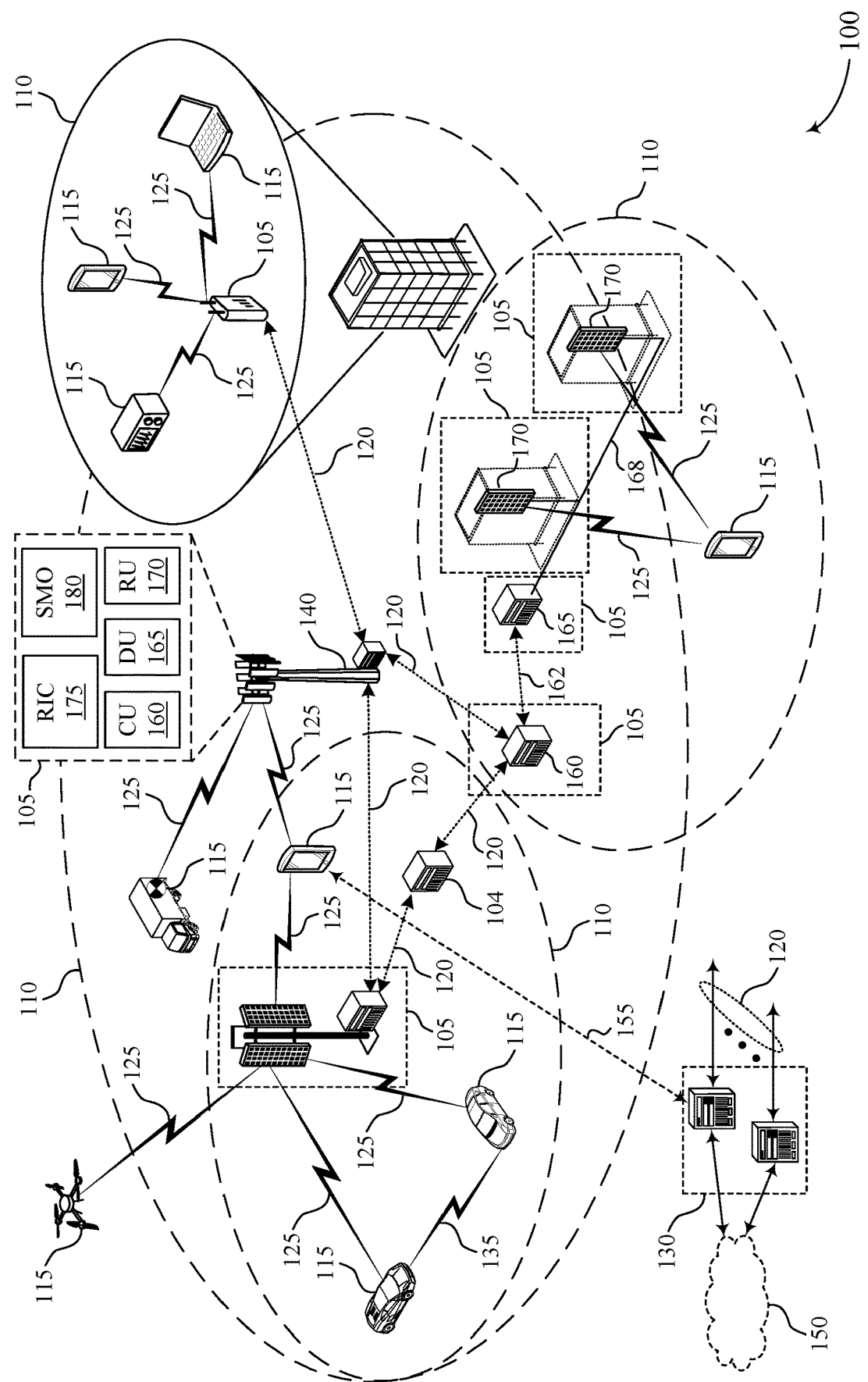
FIG. 1 illustrates an example of a wireless communications system that supports interference mitigation for full-duplex network entity in accordance with one or more aspects of the present disclosure.

FIG. 1 illustrates an example of a wireless communications system 100 that supports interference mitigation for full-duplex network entity in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support interference mitigation for full-duplex network entity as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, in which case $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described herein with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In wireless communications systems (e.g., wireless communications system 100) a full-duplex network entity 105 may co-exist (e.g., operate over the same channel or operate over adjacent channels) with another network entity 105 that may operate in a half-duplex mode or a full-duplex mode, and these network entities 105 may be positioned such that the co-existing network entities 105 operating in the modes may experience co-existence interference. For example, a half-duplex network entity may transmit a downlink signal over a bandwidth overlapping the allocated uplink bandwidth of a full-duplex network entity, which may result in coexistence interference.

Wireless communications systems described herein, such as the wireless communications system 100, support techniques for interference mitigation between co-existing network entities 105. For example, the full-duplex network entity may indicate, to the half-duplex network entity, an interference mitigation action to perform for a duration of TTIs. The interference mitigation action may include adjusting the power of transmissions at an overlapping bandwidth (e.g., muting or power reduction), configuring a larger guard band, or any combination thereof. As described herein, a half-duplex network entity 105 in wireless communications system 100 may support interference mitigation by performing the interference mitigation action, thereby increasing the reliability of communications. Similarly, a full-duplex network entity 105 in wireless communications system 100 may support interference mitigation by performing the interference mitigation action.

Figure 2:
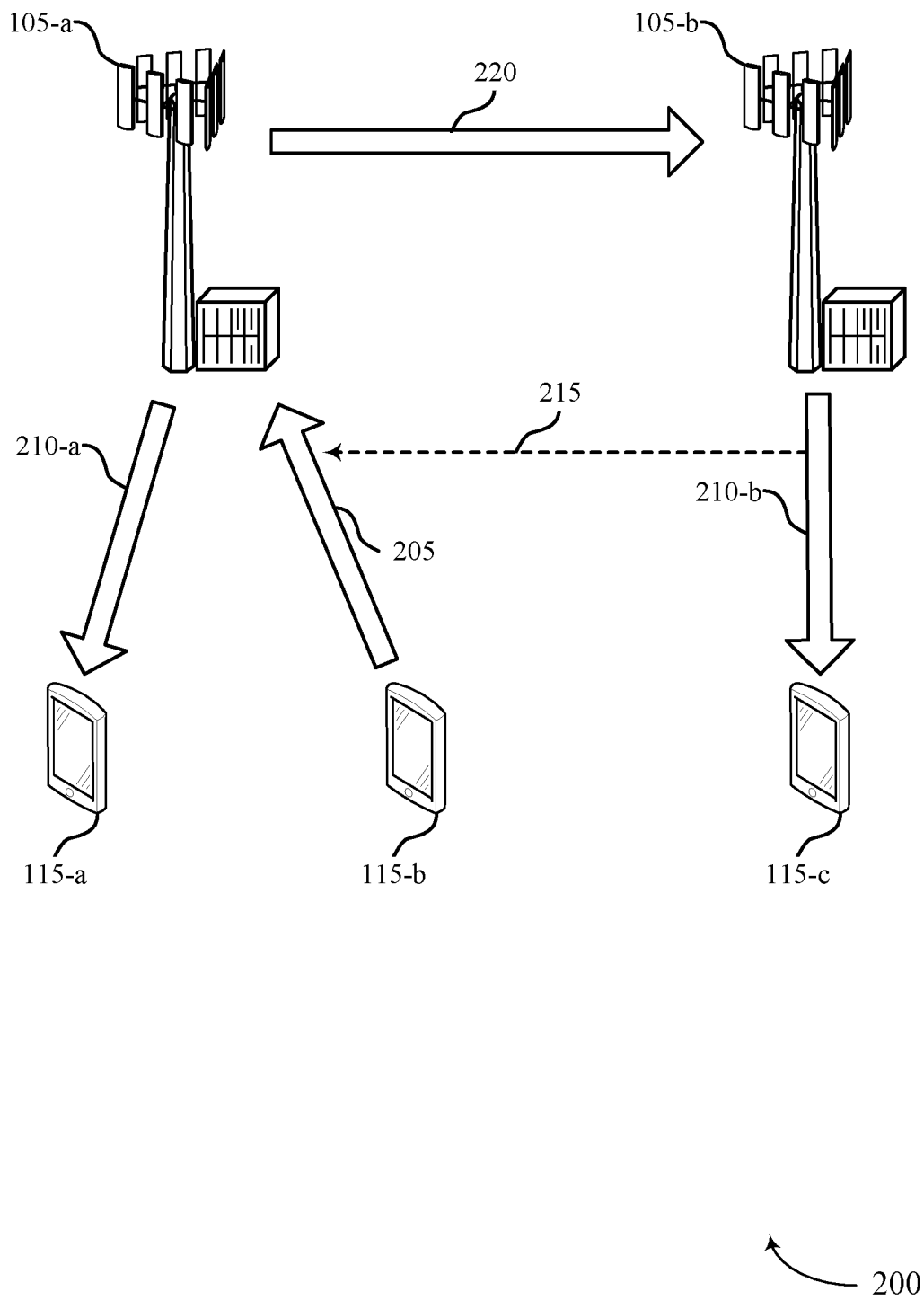
FIG. 2 illustrates an example of a wireless communications system that supports interference mitigation for full-duplex network entity in accordance with one or more aspects of the present disclosure.

FIG. 2 illustrates an example of a wireless communications system 200 that supports interference mitigation for full-duplex network entity in accordance with one or more aspects of the present disclosure. In some examples, the wireless communications system 200 may implement aspects of wireless communications system 100. In some cases, the wireless communications system 200 may include at least two network entities (e.g., a network entity 105-a and a network entity 105-b) and a group of UEs (e.g., a UE 115-a, a UE 115-b, and a UE 115-c), which may be examples of a network entity 105 and a UE 115, respectively, as described herein with reference to FIG. 1. In some cases, the group of UEs 115 may each communicate with an associated network entity in accordance with a half-duplex mode (e.g., receiving downlink communications or transmitting uplink communications separately). For example, for any given transmission time interval (TTI), a half-duplex UE 115 may be operable to receive downlink communications (e.g., downlink transmission 210-a or downlink transmission 210-b) or transmit uplink communications (e.g., uplink transmission 205), but not simultaneously. Additionally, or alternatively, one or more of the network entities 105 may operate in accordance with a full-duplex mode (e.g., receiving downlink communications and transmitting uplink communications simultaneously), and may communicate with multiple UEs 115 at a time (e.g., transmitting downlink transmission 210-a to the UE 115-a and receiving uplink transmission 205 from the UE 115-b on the same frame or during the same transmission time intervals). In some examples, a full-duplex network entity may support subband full-duplex (SBFD) mode, which may allow for a bandwidth to be partitioned between uplink and downlink for a single TTI.

In some cases, two network entities 105 may co-exist (e.g., operate over a same channel or operate over an adjacent channel). For example, a first network entity 105-*a* (e.g., operating according to a full-duplex mode) and a second network entity 105-*b* (e.g., operating according to a half-duplex mode) may belong to the same centralized unit (CU) (e.g., operate over a same channel). Additionally, or alternatively, the network entities 105 may belong to two separate CUs (e.g., operate over the same channel for the same operator or operate over different channels for different operators), which may result in signaling between the CUs (e.g., Xn signaling). In some examples, co-existing network entities 105 may support different wideband and subband configurations. For example, in cases where the network entity 105-*a* and the network entity 105-*b* share a same CU (e.g., co-channel coexistence), the network entity 105-*a* may operate according to a full-duplex mode (e.g., SBFD mode), while the network entity 105-*b* may operate in the half-duplex mode (e.g., TDD mode). Additionally, or alternatively, if the network entity 105-*a* and the network entity 105-*b* use different CUs (e.g., adjacent channel interference), a first CU may operate according to a full-duplex mode (e.g., SBFD) and a second CU may operate according to a half-duplex mode (e.g., TDD).

In some cases, the first network entity 105-*a* and the second network entity 105-*b* may experience co-existence interference (e.g., co-channel interference or adjacent channel interference). For instance, the network entity 105-*a* may be receiving an uplink transmission 205 from the UE 115-*b* and transmitting a downlink transmission 210-*a* to the UE 115-*c* during the same or overlapping TTIs, and the network entity 105-*b* may be transmitting a downlink transmission 210-*b* to the UE 115-*c* during the same or overlapping TTIs. In some examples, the network entity 105-*a* may experience interference (e.g., illustrated by arrow 215) caused by the downlink transmission 210-*b* from the network entity 105-*b*. The interfering downlink transmission 210-*b* may be experienced in the receipt of the uplink transmission 205. The interfering downlink transmission 210-*b* received or experienced directly by an uplink panel on the network entity 105-*a* (e.g., co-channel interference), or may cause interchannel interference (e.g., adjacent channel interference).

In some cases, the network entity 105-*a* may receive an indication that communications with a first UE (e.g., the UE 115-*a*) are subject to interference by communications between the network entity 105-*b* and a second UE (e.g., the UE 115-*c*). For example, the first UE 115-*a* may indicate, to the network entity 105-*a*, that a prior communication from the network entity 105-*b* has interfered with one or more prior communications from the network entity 105-*a*. The indication may be in the form of a interference measurement or channel state information repot. In some examples, the indication may be received based on the network entity 105-*a* detecting the interference in a prior transmission. Additionally, or alternatively, the network entity 105-*a* may receive the interference indication from a CU. Accordingly, the network entity 105-*a* may transmit signaling 220 (e.g., over the air (OTH) signaling, backhaul signaling, and the like) the network entity 105-*b* to perform an interference mitigation action for a number of TTIs or slots (e.g., N slots). For example, the network entity 105-*a* may indicate (e.g., via signaling 220), to the network entity 105-*b*, that the network entity 105-*a* is to receive one or more urgent or high priority communications during the next N slots, and may request that the network entity 105-*b* suppress the interference of the urgent or high priority communications.

The example of FIG. 2 is described herein with reference to the network entity 105-*a* requesting that the network entity 105-*b* perform the interference mitigation action. However, it should be understood that the techniques described herein may be performed differently. For example, the network entity 105-*b* may request that the network entity 105-*a* perform an interference mitigation action such as to mitigate interference for communications with the UE 115-*c*. In another example, both network entities 105-*a* and 105-*b* may be full-duplex network entities and the techniques described herein may be used to support interference mitigation.

Figure 3A:
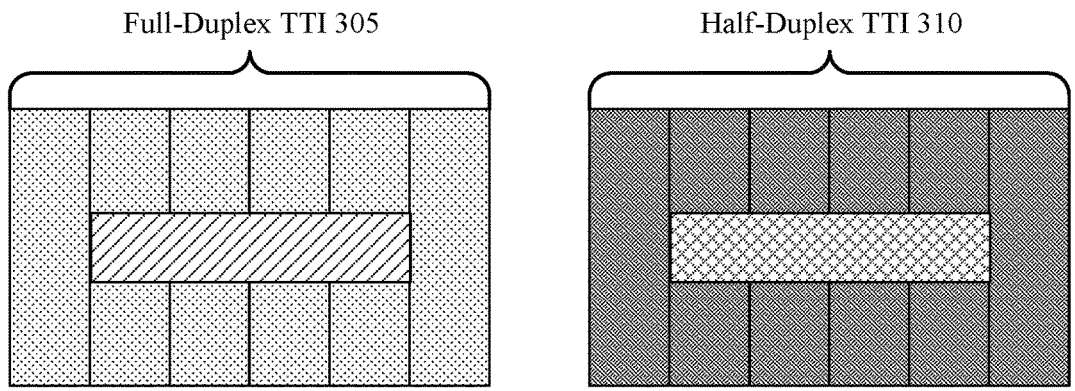
FIG. 3A and FIG. 3B illustrate examples of resource diagrams that support interference mitigation for full-duplex network entity in accordance with one or more aspects of the present disclosure.
Figure 3B:
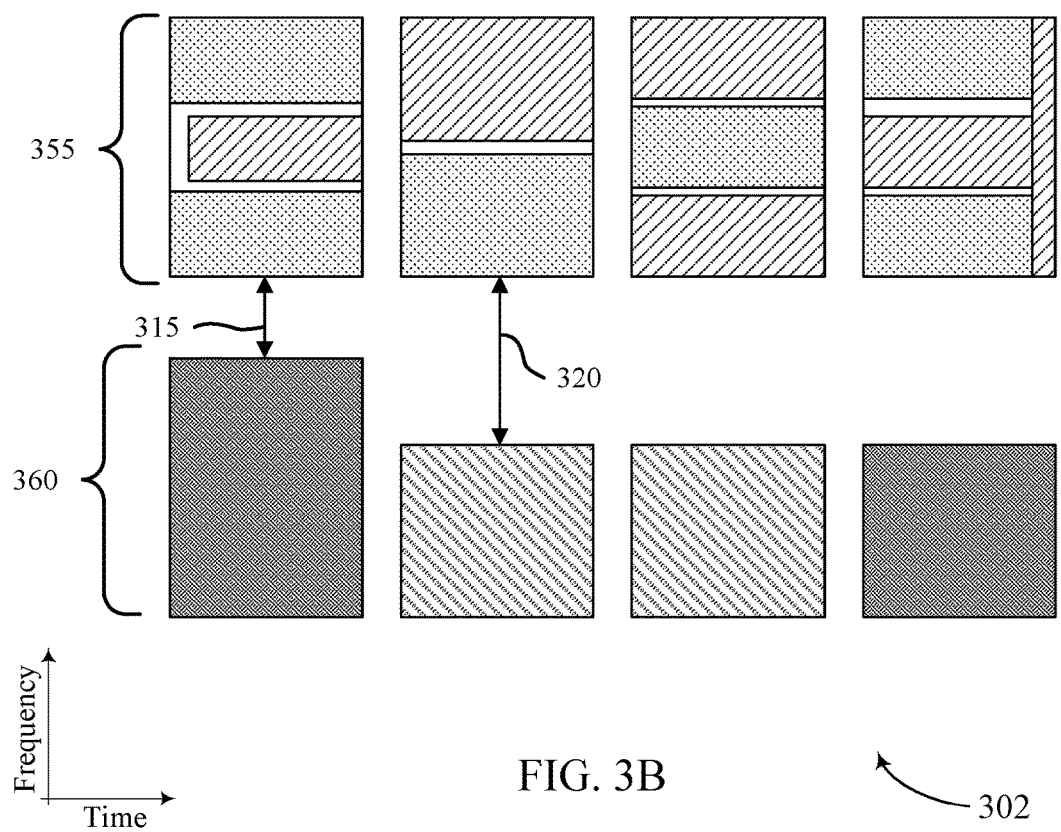

FIG. 3A and FIG. 3B illustrates example resource diagrams 301 and 302 that support interference mitigation for full-duplex network entity in accordance with one or more aspects of the present disclosure. In some examples, the resource diagrams 301 and 302 may be implemented by aspects of wireless communications systems 100 and 200. The resource diagrams 301 and 302 may be implemented by one or more network entities 105 and UEs 115, which may be examples of network entities 105 and UEs 115 as described herein with reference to FIGS. 1 and 2. As described herein with reference to FIG. 2, a first full-duplex network entity and a second half-duplex network entity may employ aspects of the resource diagrams 301 and 302 to implement interference mitigation between co-existing network entities 105.

FIG. 3A illustrates the resource diagram 301 which supports mitigating co-channel interference or adjacent channel interference by adjusting the power of half-duplex transmissions in a subband overlapping with full-duplex transmissions. In some cases, a full-duplex network entity 105 may communicate with one or more UEs 115 via a full-duplex TTI 305. The full-duplex TTI 305 represent one or more slots, which may include one or more subbands supporting uplink communications, downlink communications, or both. For example, the full-duplex TTI 305 may, at a first slot or interval, allocate all of the bandwidth for one type of communication (e.g., full-duplex downlink bandwidth 325 or full-duplex uplink bandwidth). Additionally, or alternatively, the full-duplex TTI 305 may, for a duration of N slots or intervals, allocate a first subband to full-duplex downlink bandwidth 325, and may allocate a second subband to full-duplex uplink bandwidth 330.

In some cases, a half-duplex network entity 105 may communicate with one or more UEs 115 via a half-duplex TTI 310. The half-duplex TTI 310 may include or represent one or more slots, which may be allocated bandwidth to support either uplink communications or downlink communications. In some cases, the half-duplex network entity 105 may co-exist with the full-duplex network entity 105, and may cause interference when attempting scheduled transmissions to served UEs 115. For example, the half-duplex network entity 105 may transmit downlink communications (e.g., to a serviced UE 115) on a subband which may at least partially overlap with an uplink subband used by the full-duplex network entity 105 to receive communications (e.g., from a serviced UE 115), resulting in coexistence interference. Accordingly, the full-duplex network entity 105 may signal, to the half-duplex network entity 105, a request to perform a frequency mitigation action.

In some cases, the interference mitigation action may include adjusting the power of overlapping bandwidths between the network entities 105. For instance, the half-duplex network entity 105 may, in response to the request, refrain from transmitting downlink communications (e.g., muting) over a subband which at least partially overlaps with a subband allocated for uplink communications by the full-duplex network entity 105. By muting transmissions over the overlapping subband, a UE 115 serviced by the full-duplex network entity 105 may be protected from intra-resource block (e.g., co-channel coexistence) or inter-resource block (e.g., adjacent channel coexistence) cross-link interference (CLI). Additionally, or alternatively, the half-duplex network entity 105 may instead reduce the transmission power for downlink communications within the overlapping subband. For example, the half-duplex network entity 105 may reduce the power of a downlink transmission which shares a center frequency with the uplink bandwidth allocated by the full-duplex network entity 105. By reducing the power of transmissions over the overlapping subband, the half-duplex network entity 105 may support continued communication with serviced UEs 115 while mitigating interference with the full-duplex network entity 105.

FIG. 3B illustrates resource diagram 302 which supports mitigating adjacent-channel interference by configuring the size of a guard band between the channels the network entities 105 are using. For instance, the full-duplex network entity 105 operating on a first channel 355 and the half-duplex network entity 105 operating on a second channel 360 may be spectrally spaced by a first guard band 315. As illustrated, the first channel 355 may be an example of a channel configured for SBFD operation, as slots in the channel may be configured with both downlink bandwidth (e.g., full-duplex downlink bandwidth 325) and uplink bandwidth (e.g., full-duplex uplink bandwidth 330). Various TTI configurations of channel 355 are illustrated, and it should be understood that the techniques described herein may be applicable to the various SBFD TTI configurations. The channel 360 may be an example of a TDD mode implemented by a network entity 105, and each TTI may include downlink resource (e.g., half-duplex downlink bandwidth 335) or uplink resources (e.g., half-duplex uplink bandwidth 350). In some cases, the guard band 315 may not provide sufficient separation in frequency to prevent inter-channel CLI, and the interference mitigation action may include configuring a larger guard band 320. The larger guard band 320 may adjust resource allocation (e.g., start frequency, frequency range, guard band, or any combination thereof) in between the channels such as to reduce the interference between channels.

In some examples, the full-duplex network entity 105 may determine an interference level resulting from the half-duplex network entity 105, and may use the interference level to provide more specific instructions for the interference mitigation action. For instance, the full-duplex network entity 105 may indicate the interference mitigation action associated with an explicit downlink power backoff value (e.g., to be applied at power-adjusted subband 340) or an increased guard band value (e.g., guard band 315) based on the determined interference level. Additionally, or alternatively, the full-duplex network entity may determine a significant interference level for urgent or high priority communications, and may indicate the interference mitigation action is to mute transmissions at an overlapping subband (e.g., power-adjusted subband 340). As described herein, in some examples, the half-duplex network entity 105 may request that the full-duplex network entity perform the interference mitigation action. As a result, the full-duplex network entity may reduce a transmission power (e.g., in a partially overlapping subband), mute transmissions (e.g., in an overlapping subband), and/or implement a larger guard band between channels. In some examples, the full-duplex network entity may stop or mute transmissions on a full downlink bandwidth (e.g., not use the downlink resources for communications) in order to mitigate interference.

Figure 4:
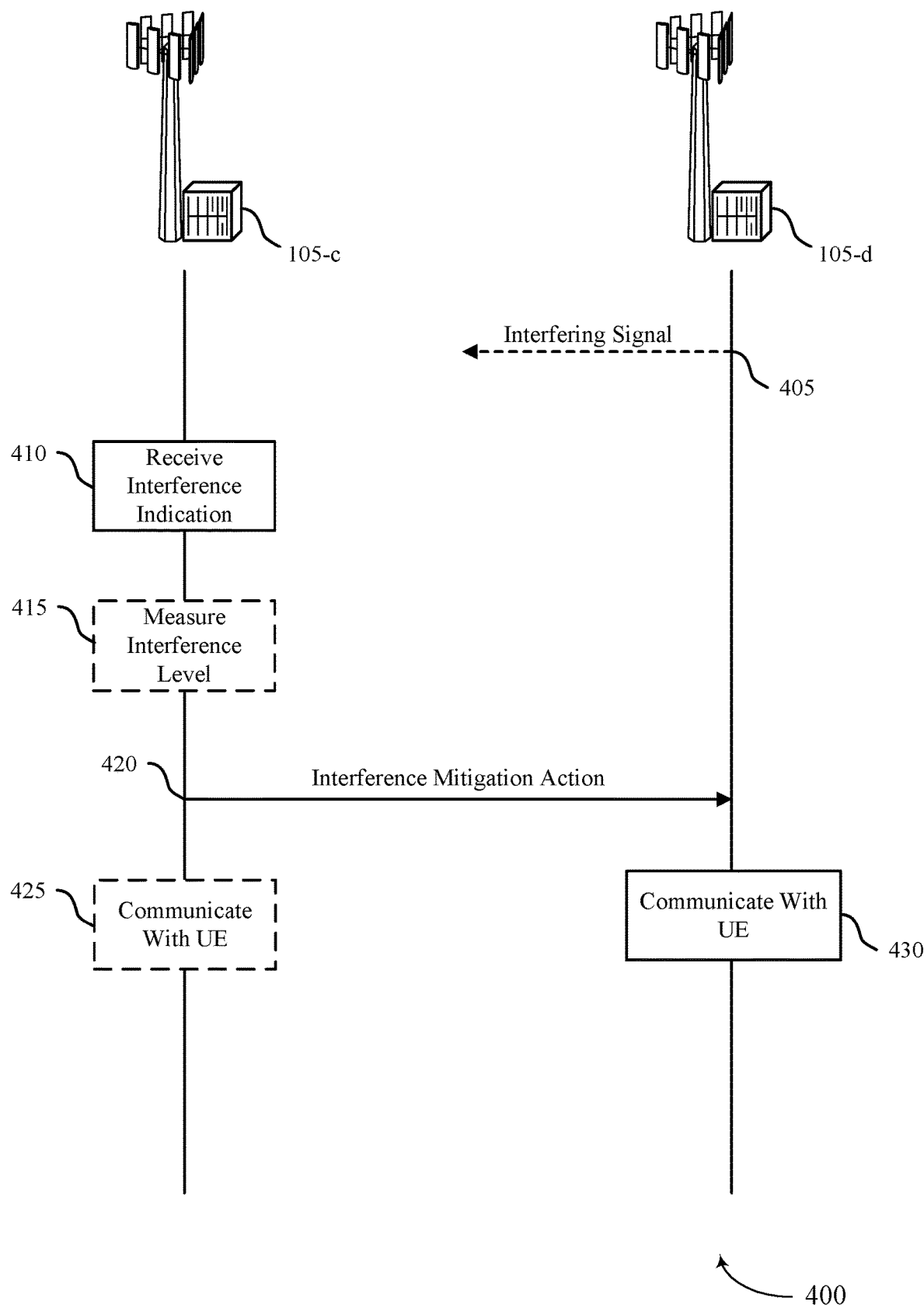
FIG. 4 illustrates an example of a process flow that supports interference mitigation for full-duplex network entity in accordance with one or more aspects of the present disclosure.

FIG. 4 illustrates an example of a process flow 400 that supports interference mitigation for full-duplex network entity in accordance with one or more aspects of the present disclosure. The process flow 400 may be implemented by a network entity 105-c and a network entity 105-d, which may be respective examples of a network entity 105-a and a network entity 105-b as described with respect to FIG. 2. In some examples, some signaling or procedure of the process flow 400 may occur in different orders than shown. Additionally, or alternatively, some additional procedures of signaling may occur, or some signaling or procedures may not occur.

At 405, the network entity 105-d may transmit an interfering signal to a UE 115, and the interfering signal may interference with communications by network entity 105-c. In some cases, the network entity 105-d may be transmitting downlink communications to a serviced UE 115, and may cause interference with an uplink communication to be received by the network entity 105-c. For instance, the network entity 105-d may transmit downlink communications on a bandwidth which at least partially overlaps with allocated uplink bandwidth for uplink communications at the network entity 105-c, which may cause by a transmission by a UEs 115 serviced by the network entity 105-c. In some examples, the network entity 105-c may operate in a full-duplex mode, and a transmission on an uplink resource may be subject to the interference by the interfering signal at 405, which may be a downlink transmission by the network entity 105-d operating in a half-duplex mode or a full-duplex mode. In other examples, the network entity 105-c may operate in a half-duplex mode, and a transmission on an uplink resource to the network entity 105-c may be subject to interference caused by a downlink transmission by the network entity 105-d on a downlink resource. In such cases, the network entity 105-d may be operating in the full-duplex mode. As such, the overlapping downlink and uplink resources which may result in interfering communications may be caused by one or both network entities 105-c and 105-d operating in a full-duplex mode.

At 410, the network entity 105-c may receive, based at least in part on at least one of the network entity 105-c and the network entity 105-d operating in a full-duplex mode, an indication that a first communication with a first UE by the network entity 105-c in a first channel is subject to interference by a second communication by the network entity 105-d with a second UE in a second channel that is adjacent to or overlaps with the first channel in a frequency domain. In some examples, the indication may be received from a UE based on a prior transmission (e.g., a prior communication by the network entity 105-d interferes with a prior communication by the network entity 105-c). In some cases, the indication is received from a CU, which may indicate that the resources are overlapping or that a prior communication was subject to interference. In some examples, the indication is received from the network entity 105-d (e.g., via backhaul communications).

In some cases, at 415, the network entity 105-c may measure an interference level based on the interference indication. For example, the network entity 105-c may determine, based on the measured interference level, that fully muting an overlapping bandwidth is not necessary due to relatively small interference (e.g., detected interference relative to a threshold), and may instead recommend an explicit power backoff value. Additionally, or alternatively, the network entity 105-*c* may determine, based on the measured interference level, that the guard band between adjacent channels should be configured to be larger. In some cases, the network entity 105-*c* may determine, based on the measured interference level, that the interference is significant enough (e.g., the measured interference is greater than a threshold) to recommend muting overlapping bandwidths. In some examples, rather than measuring interference, the network entity 105-*c* may receive an indication of the interference level and use the received indication to determine the interference mitigation action or value (e.g., power backoff value or guard band value).

At 420, the network entity 105-*c* may transmit, in response to receiving the indication, signaling including a request that the second network entity is to perform an interference mitigation action for the second communication with the second UE during one or more transmission time intervals. In some examples, the request may include an indication that the first communication to be received from a UE is associated with a high priority during the one or more TTIs. In some cases, the signaling may include a requested mitigation action and one or more values (e.g., power backoff values or a guard band value) that are to be applied for the interference mitigation action. In other examples, the network entity 105-*d* is configured with the interference mitigation action, one or more values to be applied to the action, or both, prior to receiving the signaling at 420. For example, one or both network entities 105-*c* may be configured with an interference mitigation action and/or values to be applied to the action by respective CUs. In some examples, the signaling at 420 may be transmitted through CUs rather than directly between the network entities 105-*c* and 105-*d*.

At 425, the network entity 105-*c* may communicate with the UE during the one or more transmission time intervals based at least in part on transmitting the signaling including the request. At 430, the network entity 105-*d* may communicate with the first UE in the first channel during the one or more transmission time intervals based at least in part on receiving the signaling including the request to perform the interference mitigation action. In some cases, the network entity 105-*d* may perform the requested or indicated interference mitigation action. For example, the network entity 105-*d* refrains from transmitting on a first subband of a channel (e.g., used by the network entity 105-*d*) that at least partially overlaps with a second subband of a channel (e.g., used by the network entity 105-*c*) in accordance with the interference mitigation action. In another example, the network entity 105-*d* may transmit the communication on first subband of the channel with a reduced downlink transmission power in accordance with the interference mitigation action, wherein the first subband at least partially overlaps with a second subband of channel that is to be used for the communication by the network entity 105-*c*. In another example, the network entity 105-*d* applies an interference mitigation guard band between the first communication in the channel (e.g., used by the network entity 105-*d*) and a frequency of a channel used by the network entity 105-*c*.

Figure 5:
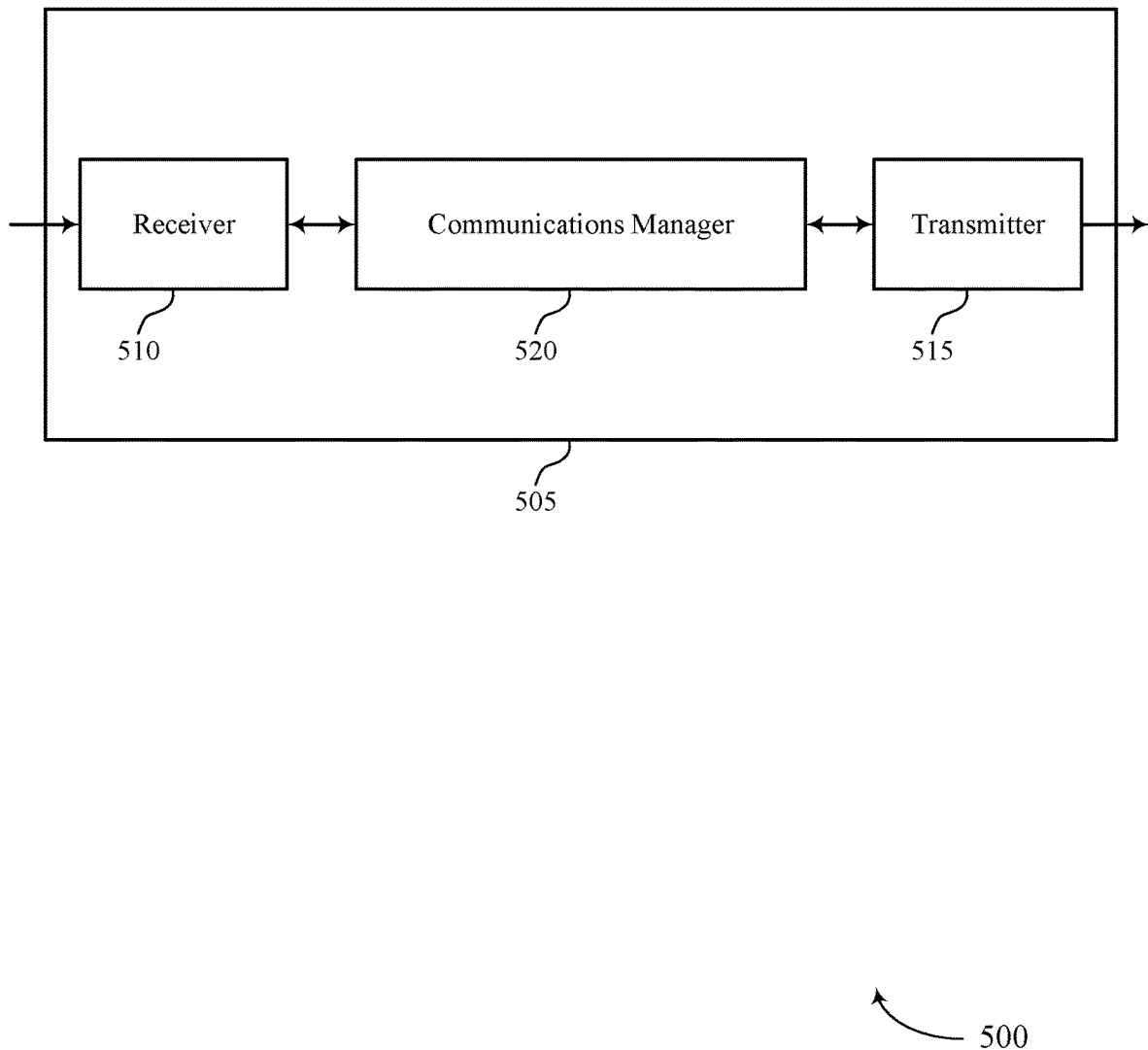
FIGS. 5 and 6 show block diagrams of devices that support interference mitigation for full-duplex network entity in accordance with one or more aspects of the present disclosure.

FIG. 5 shows a block diagram 500 of a device 505 that supports interference mitigation for full-duplex network entity in accordance with one or more aspects of the present disclosure. The device 505 may be an example of aspects of a network entity 105 as described herein. The device 505 may include a receiver 510, a transmitter 515, and a communications manager 520. The device 505 may also include a processor (not shown). Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of interference mitigation for full-duplex network entity as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor (not shown), a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory (not shown) coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

For example, the communications manager 520 may be configured as or otherwise support a means for receiving, based on at least one of the first network entity and a second network entity operating in a full-duplex mode, an indication that a first communication with a first UE by the first network entity in a first channel is subject to interference by a second communication by the second network entity with a second UE in a second channel that is adjacent to or overlaps with the first channel in a frequency domain. The communications manager 520 may be configured as or otherwise support a means for transmitting, in response to receiving the indication, signaling including a request that the second network entity is to perform an interference mitigation action for the second communication with the second UE during one or more transmission time intervals. The communications manager 520 may be configured as or otherwise support a means for communicating with the first UE during the one or more transmission time intervals based on transmitting the signaling including the request.

Additionally, or alternatively, the communications manager 520 may support wireless communication a first network entity in accordance with examples as disclosed herein. For example, the communications manager 520 may be configured as or otherwise support a means for receiving, based on one of the first network entity and a second network entity operating in a full-duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE. The communications manager 520 may be configured as or otherwise support a means for communicating with the first UE in the first channel during the one or more transmission time intervals based on receiving the signaling including the request to perform the interference mitigation action.

By including or configuring the communications manager 520 in accordance with examples as described herein, the device 505 (e.g., a processor controlling or otherwise coupled with the receiver 510, the transmitter 515, the communications manager 520, or any combination thereof) may support techniques for may support techniques for mitigating interference between co-existing network entities 105. For example, by performing an interference mitigation action, a half-duplex network entity 105 may reduce overall interference experienced by a full-duplex network entity 105, thereby reducing processing overhead at one or more network entities.

Figure 6:
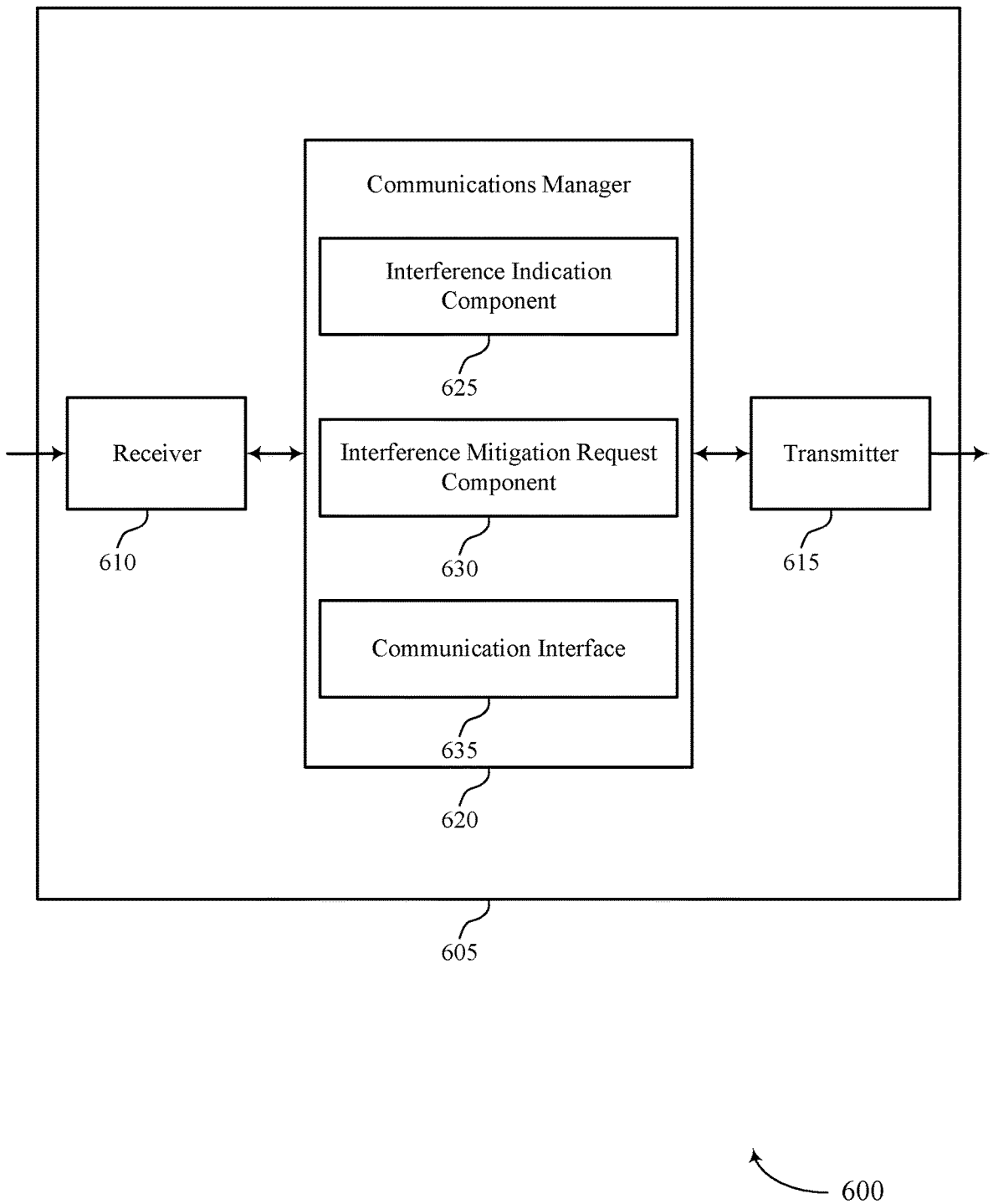

FIG. 6 shows a block diagram 600 of a device 605 that supports interference mitigation for full-duplex network entity in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of interference mitigation for full-duplex network entity as described herein. For example, the communications manager 620 may include an interference indication component 625, an interference mitigation request component 630, a communication interface 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The interference indication component 625 may be configured as or otherwise support a means for receiving, based on at least one of the first network entity and a second network entity operating in a full-duplex mode, an indication that a first communication with a first UE by the first network entity in a first channel is subject to interference by a second communication by the second network entity with a second UE in a second channel that is adjacent to or overlaps with the first channel in a frequency domain. The interference mitigation request component 630 may be configured as or otherwise support a means for transmitting, in response to receiving the indication, signaling including a request that the second network entity is to perform an interference mitigation action for the second communication with the second UE during one or more transmission time intervals. The communication interface 635 may be configured as or otherwise support a means for communicating with the first UE during the one or more transmission time intervals based on transmitting the signaling including the request.

Additionally, or alternatively, the communications manager 620 may support wireless communication a first network entity in accordance with examples as disclosed herein. The interference mitigation request component 630 may be configured as or otherwise support a means for receiving, based on one of the first network entity and a second network entity operating in a full-duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE. The communication interface 635 may be configured as or otherwise support a means for communicating with the first UE in the first channel during the one or more transmission time intervals based on receiving the signaling including the request to perform the interference mitigation action.

Figure 7:
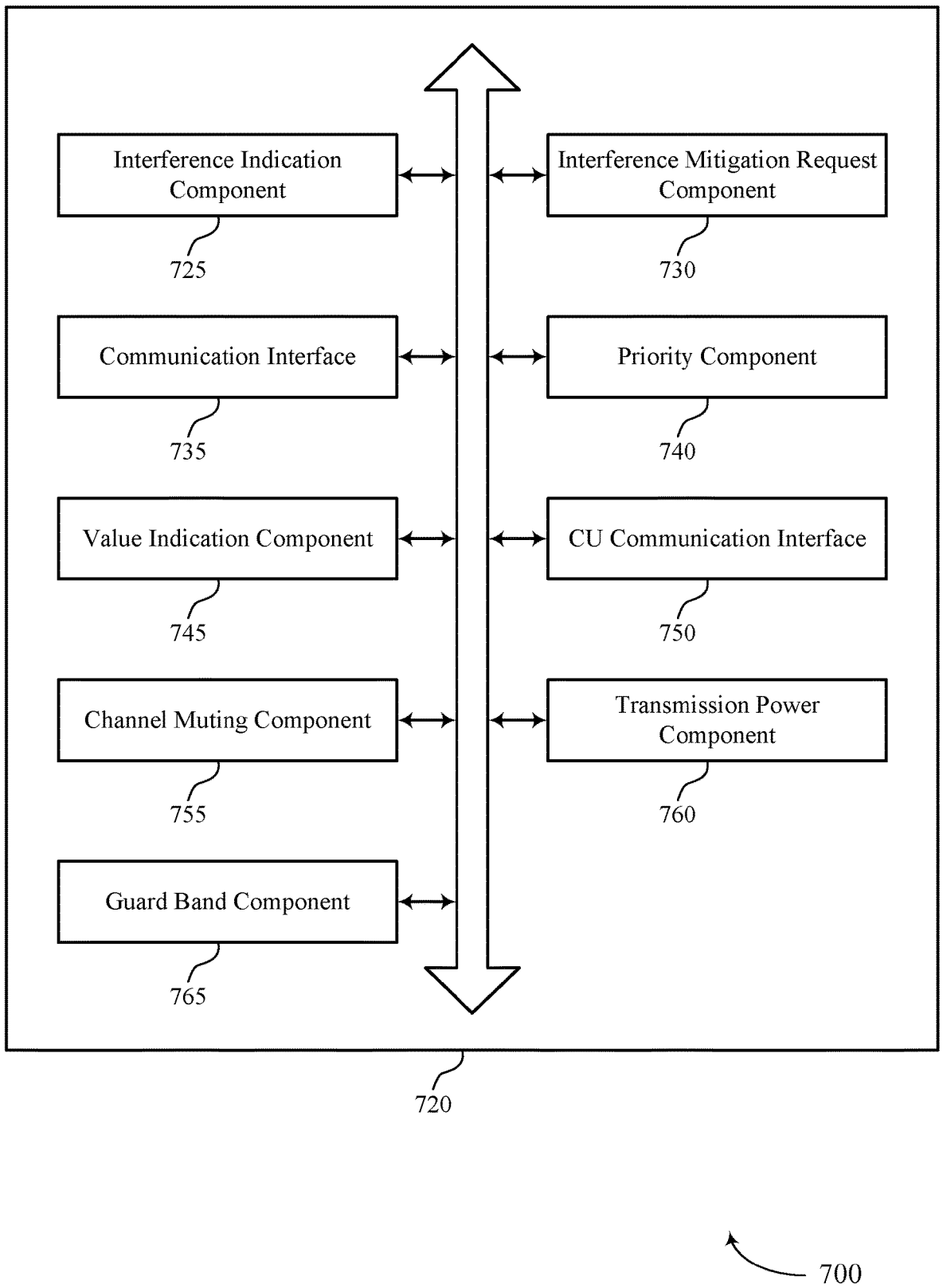
FIG. 7 shows a block diagram of a communications manager that supports interference mitigation for full-duplex network entity in accordance with one or more aspects of the present disclosure.

FIG. 7 shows a block diagram 700 of a communications manager 720 that supports interference mitigation for full-duplex network entity in accordance with one or more aspects of the present disclosure. The communications manager 720 may be an example of aspects of a communications manager 520, a communications manager 620, or both, as described herein. The communications manager 720, or various components thereof, may be an example of means for performing various aspects of interference mitigation for full-duplex network entity as described herein. For example, the communications manager 720 may include an interference indication component 725, an interference mitigation request component 730, a communication interface 735, a priority component 740, a value indication component 745, a CU communication interface 750, a channel muting component 755, a transmission power component 760, a guard band component 765, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The interference indication component 725 may be configured as or otherwise support a means for receiving, based on at least one of the first network entity and a second network entity operating in a full-duplex mode, an indication that a first communication with a first UE by the first network entity in a first channel is subject to interference by a second communication by the second network entity with a second UE in a second channel that is adjacent to or overlaps with the first channel in a frequency domain. The interference mitigation request component 730 may be configured as or otherwise support a means for transmitting, in response to receiving the indication, signaling including a request that the second network entity is to perform an interference mitigation action for the second communication with the second UE during one or more transmission time intervals. The communication interface 735 may be configured as or otherwise support a means for communicating with the first UE during the one or more transmission time intervals based on transmitting the signaling including the request.

In some examples, to support transmitting the signaling, the priority component 740 may be configured as or otherwise support a means for transmitting an indication that the first network entity is to receive the first communication that is associated with a high priority during the one or more transmission time intervals.

In some examples, to support receiving the indication, the interference indication component 725 may be configured as or otherwise support a means for receiving, from the first UE, signaling indicating that a prior communication by the second network entity interferes with a prior communication by the first network entity, where the signaling indicating the request is transmitted based on receiving the signaling.

In some examples, to support transmitting the signaling, the value indication component 745 may be configured as or otherwise support a means for transmitting a power backoff value or an increased guard band value to be applied to the interference mitigation action.

In some examples, to support transmitting the signaling, the interference mitigation request component 730 may be configured as or otherwise support a means for transmitting the request to perform the interference mitigation action that is that the second network entity is to not transmit on a second subband of a of the second channel that at least partially overlaps with a first subband of the first channel that is used for the first communication.

In some examples, the first subband is an uplink subband that is used for receipt of the first communication from the first UE and the second subband is a downlink subband.

In some examples, to support transmitting the signaling, the interference mitigation request component 730 may be configured as or otherwise support a means for transmitting the request to perform the interference mitigation action that is that the second network entity is to reduce a downlink transmission power of the second communication on a second subband of the second channel that at least partially overlaps with a first subband of the first channel that is used for the first communication.

In some examples, the first subband is an uplink subband that is used for receipt of the first communication from the first UE and the second subband is a downlink subband.

In some examples, the second subband includes a downlink portion of the second channel.

In some examples, to support transmitting the signaling, the interference mitigation request component 730 may be configured as or otherwise support a means for transmitting the request to perform the interference mitigation action that is that the second network entity is to apply an interference mitigation guard band between communications in the second channel and a frequency of the first channel.

In some examples, the interference mitigation guard band is associated with a first guard bandwidth that is larger than a second guard bandwidth of a guard band that is used for communications that are not subject to the interference mitigation action.

In some examples, the first communication is an uplink communication to be transmitted by the first UE to the first network entity and the second communication is a downlink communication to be transmitted by the second network entity to the second UE based on either the first network entity or the second network entity operating in the full-duplex mode.

In some examples, either the first network entity or the second network entity is operating in a subband full-duplex mode and the first communication on an uplink subband of the first channel is subject to interference by the second communication on a downlink subband of the second channel based on either the first network entity or the second network entity operating in the subband full-duplex mode.

In some examples, to support transmitting the signaling, the CU communication interface 750 may be configured as or otherwise support a means for transmitting, to a central unit, the signaling including the request.

In some examples, to support receiving the indication, the CU communication interface 750 may be configured as or otherwise support a means for receiving, from a central unit, the signaling including the indication.

In some examples, to support receiving the indication, the CU communication interface 750 may be configured as or otherwise support a means for receiving, from a central unit, signaling that indicates the interference mitigation action.

In some examples, the interference mitigation request component 730 may be configured as or otherwise support a means for transmitting to the second network entity, an indication of the interference mitigation action that the second network entity is to perform.

Additionally, or alternatively, the communications manager 720 may support wireless communication a first network entity in accordance with examples as disclosed herein. In some examples, the interference mitigation request component 730 may be configured as or otherwise support a means for receiving, based on one of the first network entity and a second network entity operating in a full-duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE. In some examples, the communication interface 735 may be configured as or otherwise support a means for communicating with the first UE in the first channel during the one or more transmission time intervals based on receiving the signaling including the request to perform the interference mitigation action.

In some examples, to support receiving the signaling, the priority component 740 may be configured as or otherwise support a means for receiving an indication that the second network entity is to receive the second communication that is associated with a high priority during the one or more transmission time intervals, where the first network entity performs the interference mitigation action based on the second communication being associated with the high priority.

In some examples, to support receiving the signaling, the value indication component 745 may be configured as or otherwise support a means for receiving an indication of a power backoff value or an increased guard band value to be applied to the interference mitigation action.

In some examples, to support communicating with the first UE, the channel muting component 755 may be configured as or otherwise support a means for refraining from transmitting on a first subband of the first channel that at least partially overlaps with a second subband of the second channel in accordance with the interference mitigation action.

In some examples, the first subband is a downlink subband that is used for transmission of the first communication to the first UE and the second subband is an uplink subband part that is to be used for receipt of the second communication by the second network entity.

In some examples, to support communicating with the first UE, the transmission power component 760 may be configured as or otherwise support a means for transmitting first communication on first subband of the first channel with a reduced downlink transmission power in accordance with the interference mitigation action, where the first subband at least partially overlaps with a second subband of the second channel that is to be used for the second communication.

In some examples, the first subband is a downlink subband that is to be used for transmission of the first communication to the first UE and the second subband is an uplink subband that is to be used for receipt of the second communication by the second network entity.

In some examples, the first subband includes a downlink portion of the first channel.

In some examples, to support communicating with the first UE, the guard band component 765 may be configured as or otherwise support a means for applying an interference mitigation guard band between the first communication in the first channel and a frequency of the second channel.

In some examples, the interference mitigation guard band is associated with a first guard bandwidth that is larger than a second guard bandwidth that is used for communications that are not subject to the interference mitigation action.

In some examples, the first communication is a downlink communication to be transmitted by the first network entity and the second communication is an uplink communication to be transmitted by the second UE to the second network entity based on either the first network entity or the second network entity operating in the full-duplex mode.

In some examples, either the first network entity or the second network entity is operating in a subband full-duplex mode and the second communication is to be transmitted on an uplink bandwidth part of the second channel that is subject to interference by the second communication to be transmitted on a downlink bandwidth part of the first channel based on either the first network entity or the second network entity operating in the subband full-duplex mode.

In some examples, to support receiving the signaling, the interference mitigation request component 730 may be configured as or otherwise support a means for receiving, from a central unit, the signaling including the request to perform the interference mitigation action.

In some examples, the CU communication interface 750 may be configured as or otherwise support a means for receiving, from a central unit, a configuration for the interference mitigation action, where the interference mitigation action is performed based on the configuration.

In some examples, the CU communication interface 750 may be configured as or otherwise support a means for receiving, from the first network entity, an indication of the interference mitigation action.

Figure 8:
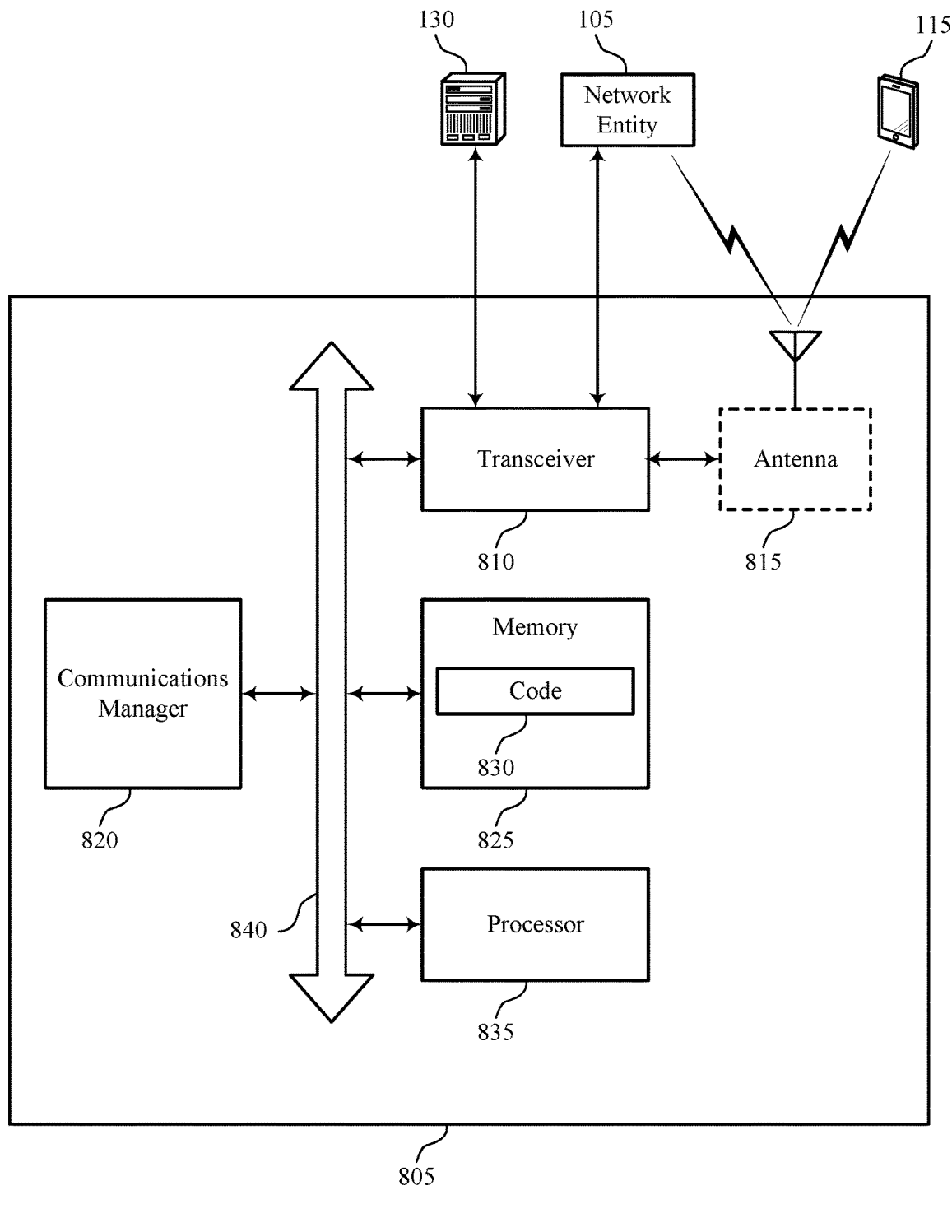
FIG. 8 shows a diagram of a system including a device that supports interference mitigation for full-duplex network entity in accordance with one or more aspects of the present disclosure.

FIG. 8 shows a diagram of a system 800 including a device 805 that supports interference mitigation for full-duplex network entity in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 515, a transmitter 615, a receiver 510, a receiver 610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting interference mitigation for full-duplex network entity). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

For example, the communications manager 820 may be configured as or otherwise support a means for receiving, based on at least one of the first network entity and a second network entity operating in a full-duplex mode, an indication that a first communication with a first UE by the first network entity in a first channel is subject to interference by a second communication by the second network entity with a second UE in a second channel that is adjacent to or overlaps with the first channel in a frequency domain. The communications manager 820 may be configured as or otherwise support a means for transmitting, in response to receiving the indication, signaling including a request that the second network entity is to perform an interference mitigation action for the second communication with the second UE during one or more transmission time intervals. The communications manager 820 may be configured as or otherwise support a means for communicating with the first UE during the one or more transmission time intervals based on transmitting the signaling including the request.

Additionally, or alternatively, the communications manager 820 may support wireless communication a first network entity in accordance with examples as disclosed herein. For example, the communications manager 820 may be configured as or otherwise support a means for receiving, based on one of the first network entity and a second network entity operating in a full-duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE. The communications manager 820 may be configured as or otherwise support a means for communicating with the first UE in the first channel during the one or more transmission time intervals based on receiving the signaling including the request to perform the interference mitigation action.

By including or configuring the communications manager 820 in accordance with examples as described herein, the device 805 may support techniques for mitigating interference between co-existing network entities 105. For example, by performing an interference mitigation action, a network entity 105 may reduce overall interference experienced by another network entity 105, thereby improving user experience and reducing latency in a wireless communications system In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described herein with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of interference mitigation for full-duplex network entity as described herein, or the processor 835 and the memory 825 may be otherwise configured to perform or support such operations.

Figure 9:
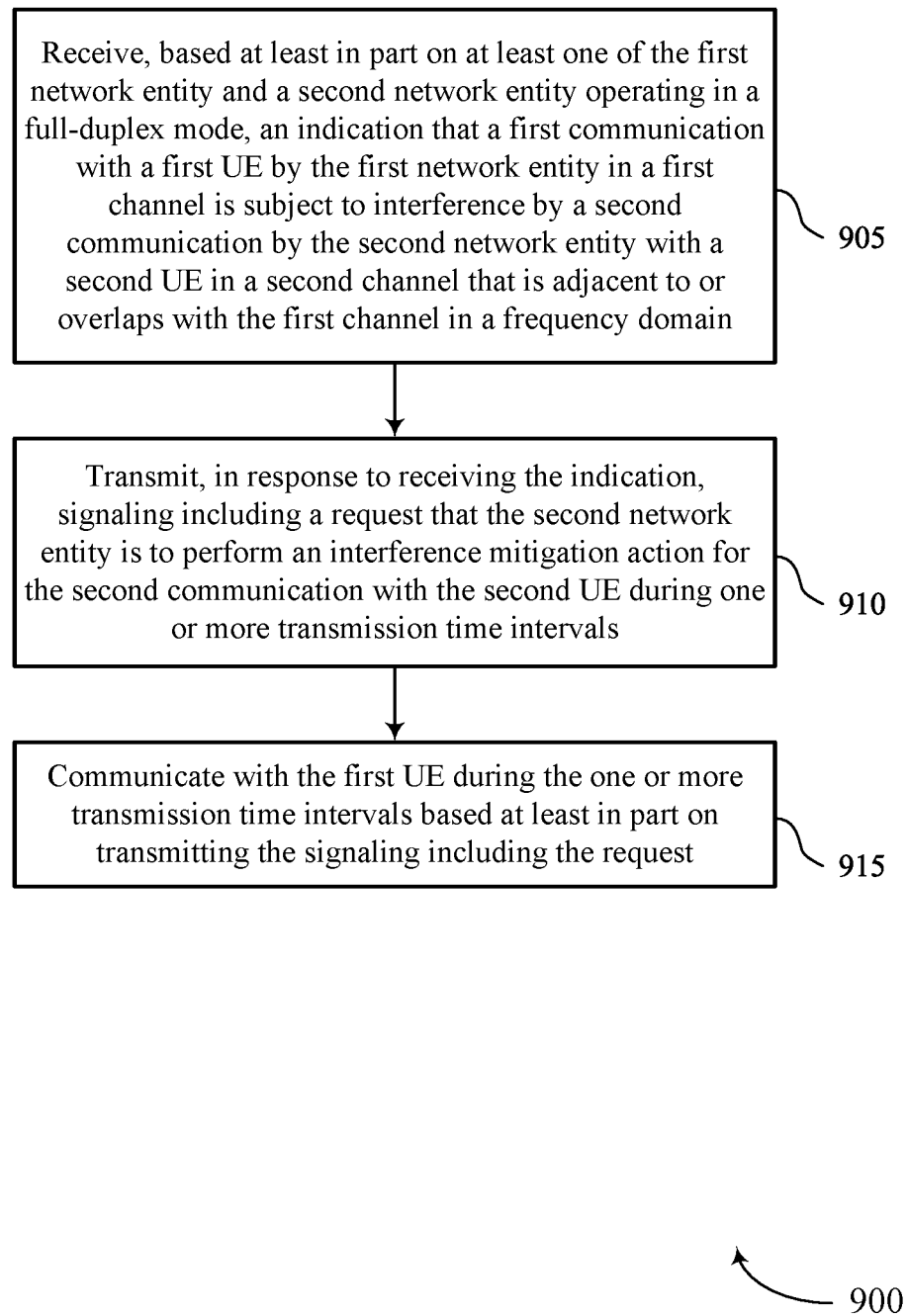
FIGS. 9 through 12 show flowcharts illustrating methods that support interference mitigation for full-duplex network entity in accordance with one or more aspects of the present disclosure.

FIG. 9 shows a flowchart illustrating a method 900 that supports interference mitigation for full-duplex network entity in accordance with one or more aspects of the present disclosure. The operations of the method 900 may be implemented by a network entity or its components as described herein. For example, the operations of the method 900 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 905, the method may include receiving, based at least in part on at least one of the first network entity and a second network entity operating in a full-duplex mode, an indication that a first communication with a first UE by the first network entity in a first channel is subject to interference by a second communication by the second network entity with a second UE in a second channel that is adjacent to or overlaps with the first channel in a frequency domain. The operations of 905 may be performed in accordance with examples as disclosed herein. In some examples, aspects of the operations of 905 may be performed by an interference indication component 725 as described herein with reference to FIG. 7.

At 910, the method may include transmitting, in response to receiving the indication, signaling including a request that the second network entity is to perform an interference mitigation action for the second communication with the second UE during one or more transmission time intervals. The operations of 910 may be performed in accordance with examples as disclosed herein. In some examples, aspects of the operations of 910 may be performed by an interference mitigation request component 730 as described herein with reference to FIG. 7.

At 915, the method may include communicating with the first UE during the one or more transmission time intervals based at least in part on transmitting the signaling including the request. The operations of 915 may be performed in accordance with examples as disclosed herein. In some examples, aspects of the operations of 915 may be performed by a communication interface 735 as described herein with reference to FIG. 7.

Figure 10:
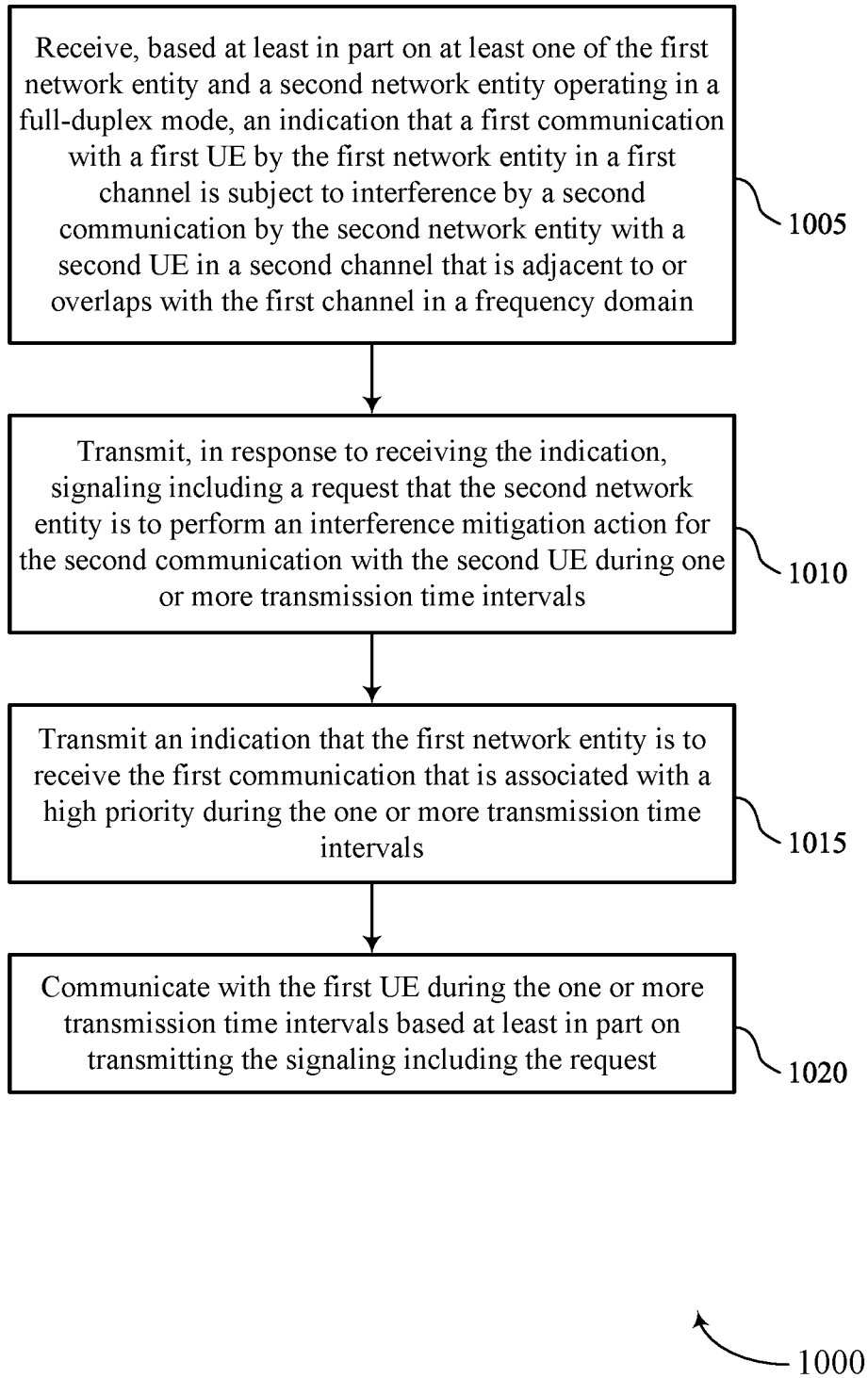

FIG. 10 shows a flowchart illustrating a method 1000 that supports interference mitigation for full-duplex network entity in accordance with one or more aspects of the present disclosure. The operations of the method 1000 may be implemented by a network entity or its components as described herein. For example, the operations of the method 1000 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1005, the method may include receiving, based at least in part on at least one of the first network entity and a second network entity operating in a full-duplex mode, an indication that a first communication with a first UE by the first network entity in a first channel is subject to interference by a second communication by the second network entity with a second UE in a second channel that is adjacent to or overlaps with the first channel in a frequency domain. The operations of 1005 may be performed in accordance with examples as disclosed herein. In some examples, aspects of the operations of 1005 may be performed by an interference indication component 725 as described herein with reference to FIG. 7.

At 1010, the method may include transmitting, in response to receiving the indication, signaling including a request that the second network entity is to perform an interference mitigation action for the second communication with the second UE during one or more transmission time intervals. The operations of 1010 may be performed in accordance with examples as disclosed herein. In some examples, aspects of the operations of 1010 may be performed by an interference mitigation request component 730 as described herein with reference to FIG. 7.

At 1015, the method may include transmitting an indication that the first network entity is to receive the first communication that is associated with a high priority during the one or more transmission time intervals. The operations of 1015 may be performed in accordance with examples as disclosed herein. In some examples, aspects of the operations of 1015 may be performed by a priority component 740 as described herein with reference to FIG. 7.

At 1020, the method may include communicating with the first UE during the one or more transmission time intervals based at least in part on transmitting the signaling including the request. The operations of 1020 may be performed in accordance with examples as disclosed herein. In some examples, aspects of the operations of 1020 may be performed by a communication interface 735 as described herein with reference to FIG. 7.

Figure 11:
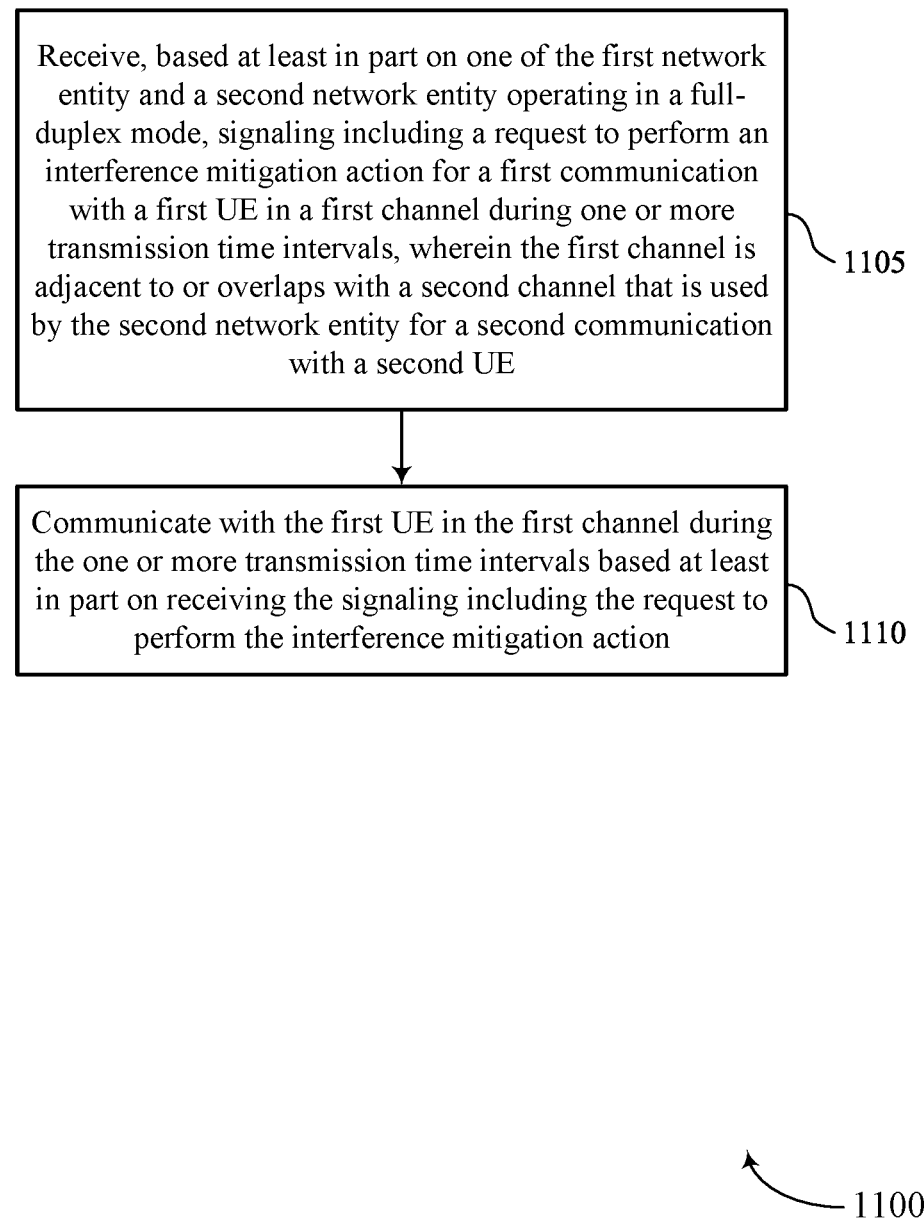

FIG. 11 shows a flowchart illustrating a method 1100 that supports interference mitigation for full-duplex network entity in accordance with one or more aspects of the present disclosure. The operations of the method 1100 may be implemented by a network entity or its components as described herein. For example, the operations of the method 1100 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1105, the method may include receiving, based at least in part on one of the first network entity and a second network entity operating in a full-duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE. The operations of 1105 may be performed in accordance with examples as disclosed herein. In some examples, aspects of the operations of 1105 may be performed by an interference mitigation request component 730 as described herein with reference to FIG. 7.

At 1110, the method may include communicating with the first UE in the first channel during the one or more transmission time intervals based at least in part on receiving the signaling including the request to perform the interference mitigation action. The operations of 1110 may be performed in accordance with examples as disclosed herein. In some examples, aspects of the operations of 1110 may be performed by a communication interface 735 as described herein with reference to FIG. 7.

Figure 12:
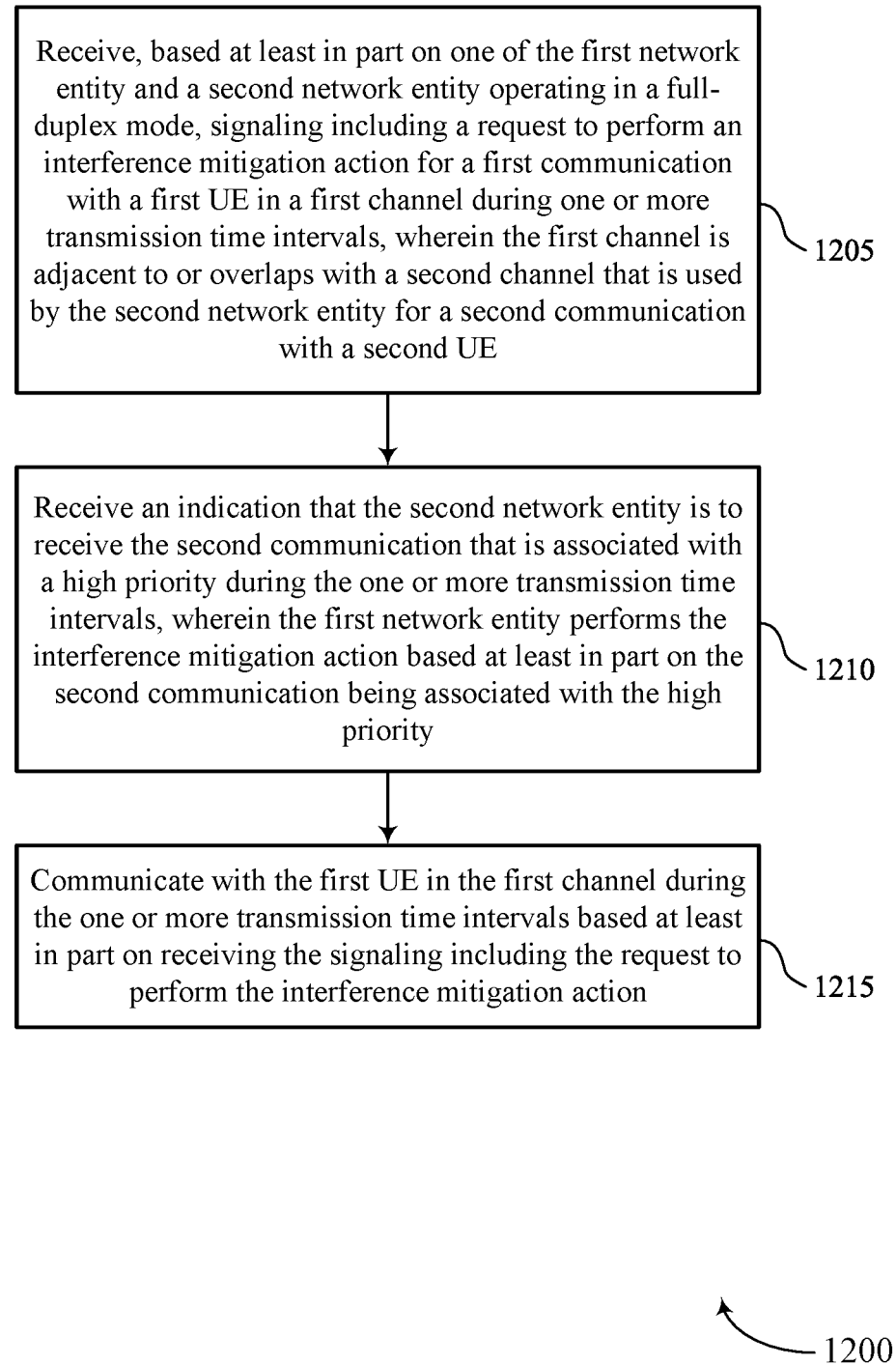

FIG. 12 shows a flowchart illustrating a method 1200 that supports interference mitigation for full-duplex network entity in accordance with one or more aspects of the present disclosure. The operations of the method 1200 may be implemented by a network entity or its components as described herein. For example, the operations of the method 1200 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1205, the method may include receiving, based at least in part on one of the first network entity and a second network entity operating in a full-duplex mode, signaling including a request to perform an interference mitigation action for a first communication with a first UE in a first channel during one or more transmission time intervals, where the first channel is adjacent to or overlaps with a second channel that is used by the second network entity for a second communication with a second UE. The operations of 1205 may be performed in accordance with examples as disclosed herein. In some examples, aspects of the operations of 1205 may be performed by an interference mitigation request component 730 as described herein with reference to FIG. 7.

At 1210, the method may include receiving an indication that the second network entity is to receive the second communication that is associated with a high priority during the one or more transmission time intervals, where the first network entity performs the interference mitigation action based at least in part on the second communication being associated with the high priority. The operations of 1210 may be performed in accordance with examples as disclosed herein. In some examples, aspects of the operations of 1210 may be performed by a priority component 740 as described herein with reference to FIG. 7.

At 1215, the method may include communicating with the first UE in the first channel during the one or more transmission time intervals based at least in part on receiving the signaling including the request to perform the interference mitigation action. The operations of 1215 may be performed in accordance with examples as disclosed herein. In some examples, aspects of the operations of 1215 may be performed by a communication interface 735 as described herein with reference to FIG. 7.

The following provides an overview of aspects of the present disclosure:

Aspect 1: A method for wireless communication at a first network entity comprising: receiving, based at least in part on at least one of the first network entity and a second network entity operating in a full duplex mode, an indication that a first communication with a first UE by the first network entity in a first channel is subject to interference by a second communication by the second network entity with a second UE in a second channel that is adjacent to or overlaps with the first channel in a frequency domain; transmitting, in response to receiving the indication, signaling including a request that the second network entity is to perform an interference mitigation action for the second communication with the second UE during one or more transmission time intervals; and communicating with the first UE during the one or more transmission time intervals based at least in part on transmitting the signaling including the request.

Aspect 2: The method of aspect 1, wherein transmitting the signaling comprises: transmitting an indication that the first network entity is to receive the first communication that is associated with a high priority during the one or more transmission time intervals.

Aspect 3: The method of any of aspects 1 through 2, wherein receiving the indication comprises: receiving, from the first UE, signaling indicating that a prior communication by the second network entity interferes with a prior communication by the first network entity, wherein the signaling indicating the request is transmitted based at least in part on receiving the signaling.

Aspect 4: The method of any of aspects 1 through 3, wherein transmitting the signaling comprises: transmitting a power backoff value or an increased guard band value to be applied to the interference mitigation action.

Aspect 5: The method of any of aspects 1 through 3, wherein transmitting the signaling comprises: transmitting the request to perform the interference mitigation action that is that the second network entity is to not transmit on a second subband of a of the second channel that at least partially overlaps with a first subband of the first channel that is used for the first communication.

Aspect 6: The method of aspect 5, wherein the first subband is an uplink subband that is used for receipt of the first communication from the first UE and the second subband is a downlink subband.

Aspect 7: The method of any of aspects 1 through 8, wherein transmitting the signaling comprises: transmitting the request to perform the interference mitigation action that is that the second network entity is to reduce a downlink transmission power of the second communication on a second subband of the second channel that at least partially overlaps with a first subband of the first channel that is used for the first communication.

Aspect 9: The method of aspect 7, wherein the first subband is an uplink subband that is used for receipt of the first communication from the first UE and the second subband is a downlink subband.

Aspect 10: The method of any of aspects 7 through 9, wherein the second subband comprises a downlink portion of the second channel.

Aspect 11: The method of any of aspects 1 through 12, wherein transmitting the signaling comprises: transmitting the request to perform the interference mitigation action that is that the second network entity is to apply an interference mitigation guard band between communications in the second channel and a frequency of the first channel.

Aspect 13: The method of aspect 11, wherein the interference mitigation guard band is associated with a first guard bandwidth that is larger than a second guard bandwidth of a guard band that is used for communications that are not subject to the interference mitigation action.

Aspect 14: The method of any of aspects 1 through 13, wherein the first communication is an uplink communication to be transmitted by the first UE to the first network entity and the second communication is a downlink communication to be transmitted by the second network entity to the second UE based at least in part on either the first network entity or the second network entity operating in the full duplex mode.

Aspect 15: The method of any of aspects 1 through 14, wherein either the first network entity or the second network entity is operating in a subband full duplex mode and the first communication on an uplink subband of the first channel is subject to interference by the second communication on a downlink subband of the second channel based at least in part on either the first network entity or the second network entity operating in the subband full duplex mode.

Aspect 16: The method of any of aspects 1 through 15, wherein transmitting the signaling comprises: transmitting, to a central unit, the signaling including the request.

Aspect 17: The method of any of aspects 1 through 16, wherein receiving the indication comprises: receiving, from a central unit, the signaling including the indication.

Aspect 18: The method of any of aspects 1 through 16, wherein receiving the indication comprises: receiving, from a central unit, signaling that indicates the interference mitigation action.

Aspect 19: The method of any of aspects 1 through 18, wherein further comprising: transmitting to the second network entity, an indication of the interference mitigation action that the second network entity is to perform.

Aspect 20: A method for wireless communication a first network entity, comprising: receiving, based at least in part on one of the first network entity and a second network entity operating in a full duplex mode, signaling including a request to perform an interference mitigation action for a first communication with a first UE in a first channel during one or more transmission time intervals, wherein the first channel is adjacent to or overlaps with a second channel that is used by the second network entity for a second communication with a second UE; and communicating with the first UE in the first channel during the one or more transmission time intervals based at least in part on receiving the signaling including the request to perform the interference mitigation action.

Aspect 21: The method of aspect 20, wherein receiving the signaling comprises: receiving an indication that the second network entity is to receive the second communication that is associated with a high priority during the one or more transmission time intervals, wherein the first network entity performs the interference mitigation action based at least in part on the second communication being associated with the high priority.

Aspect 22: The method of any of aspects 20 through 21, wherein receiving the signaling comprises: receiving an indication of a power backoff value or an increased guard band value to be applied to the interference mitigation action.

Aspect 23: The method of any of aspects 20 through 21, wherein communicating with the first UE comprises: refraining from transmitting on a first subband of the first channel that at least partially overlaps with a second subband of the second channel in accordance with the interference mitigation action.

Aspect 24: The method of aspect 23, wherein the first subband is a downlink subband that is used for transmission of the first communication to the first UE and the second subband is an uplink subband part that is to be used for receipt of the second communication by the second network entity.

Aspect 25: The method of any of aspects 20 through 26, wherein communicating with the first UE comprises: transmitting first communication on first subband of the first channel with a reduced downlink transmission power in accordance with the interference mitigation action, wherein the first subband at least partially overlaps with a second subband of the second channel that is to be used for the second communication.

Aspect 27: The method of aspect 25, wherein the first subband is a downlink subband that is to be used for transmission of the first communication to the first UE and the second subband is an uplink subband that is to be used for receipt of the second communication by the second network entity.

Aspect 28: The method of any of aspects 25 through 27, wherein the first subband comprises a downlink portion of the first channel.

Aspect 29: The method of any of aspects 20 through 30, wherein communicating with the first UE comprises: applying an interference mitigation guard band between the first communication in the first channel and a frequency of the second channel.

Aspect 31: The method of aspect 29, wherein the interference mitigation guard band is associated with a first guard bandwidth that is larger than a second guard bandwidth that is used for communications that are not subject to the interference mitigation action.

Aspect 32: The method of any of aspects 20 through 31, wherein the first communication is a downlink communication to be transmitted by the first network entity and the second communication is an uplink communication to be transmitted by the second UE to the second network entity based at least in part on either the first network entity or the second network entity operating in the full duplex mode.

Aspect 33: The method of any of aspects 20 through 32, wherein either the first network entity or the second network entity is operating in a subband full duplex mode and the second communication is to be transmitted on an uplink bandwidth part of the second channel that is subject to interference by the second communication to be transmitted on a downlink bandwidth part of the first channel based at least in part on either the first network entity or the second network entity operating in the subband full duplex mode.

Aspect 34: The method of any of aspects 20 through 33, wherein receiving the signaling comprises: receiving, from a central unit, the signaling including the request to perform the interference mitigation action.

Aspect 35: The method of any of aspects 20 through 34, further comprising: receiving, from a central unit, a configuration for the interference mitigation action, wherein the interference mitigation action is performed based at least in part on the configuration.

Aspect 36: The method of any of aspects 20 through 37, further comprising: receiving, from the first network entity, an indication of the interference mitigation action.

Aspect 38: An apparatus comprising a processor; a memory coupled with the processor, with instructions stored in the memory, and the instructions are executable by the processor to cause the apparatus to perform a method of any of aspects 1 through 19.

Aspect 39: An apparatus comprising at least one means for performing a method of any of aspects 1 through 19.

Aspect 40: A non-transitory computer-readable medium storing code the code comprising instructions executable by a processor to perform a method of any of aspects 1 through 19.

Aspect 41: An apparatus for wireless communication a first network entity, comprising a processor; a memory coupled with the processor, with instructions stored in the memory, and the instructions are executable by the processor to cause the apparatus to perform a method of any of aspects 20 through 36.

Aspect 42: An apparatus for wireless communication a first network entity, comprising at least one means for performing a method of any of aspects 20 through 36.

Aspect 43: A non-transitory computer-readable medium storing code for wireless communication a first network entity, the code comprising instructions executable by a processor to perform a method of any of aspects 20 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which case disks may reproduce data magnetically, whereas discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first network entity, comprising:
    a processor; and
    a memory coupled with the processor, with instructions stored in the memory, the instructions being executable by the processor to cause the apparatus to:
        receive, based at least in part on at least one of the first network entity and a second network entity operating in a full-duplex mode, an indication that a first communication with a first user equipment (UE) by the first network entity in a first channel is subject to interference by a second communication by the second network entity with a second UE in a second channel that is adjacent to or overlaps with the first channel in a frequency domain;
        transmit, in response to receiving the indication, signaling including a request that the second network entity is to perform an interference mitigation action for the second communication with the second UE during one or more transmission time intervals, wherein the request comprises an indication of an increased guard band value to be applied by the second network entity for the interference mitigation action; and
        communicate with the first UE during the one or more transmission time intervals based at least in part on transmitting the signaling including the request.

2. The apparatus of claim 1, wherein the instructions to transmit the signaling are executable by the processor to cause the apparatus to:
    transmit an indication that the first network entity is to receive the first communication that is associated with a high priority during the one or more transmission time intervals.

3. The apparatus of claim 1, wherein the instructions to receive the indication are executable by the processor to cause the apparatus to:
    receive, from the first UE, signaling indicating that a prior communication by the second network entity interferes with a prior communication by the first network entity, wherein the signaling indicating the request is transmitted based at least in part on receiving the signaling.

4. The apparatus of claim 1, wherein the instructions to transmit the signaling are executable by the processor to cause the apparatus to:
    transmit a power backoff value to be applied to the interference mitigation action.

5. The apparatus of claim 1, wherein the instructions to transmit the signaling are executable by the processor to cause the apparatus to:
    transmit the request to perform the interference mitigation action that is that the second network entity is to not transmit on a second subband of a of the second channel that at least partially overlaps with a first subband of the first channel that is used for the first communication.

6. The apparatus of claim 5, wherein the first subband is an uplink subband that is used for receipt of the first communication from the first UE and the second subband is a downlink subband.

7. The apparatus of claim 1, wherein the instructions to transmit the signaling are executable by the processor to cause the apparatus to:
    transmit the request to perform the interference mitigation action that is that the second network entity is to reduce a downlink transmission power of the second communication on a second subband of the second channel that at least partially overlaps with a first subband of the first channel that is used for the first communication.

8. The apparatus of claim 7, wherein the first subband is an uplink subband that is used for receipt of the first communication from the first UE and the second subband is a downlink subband.

9. The apparatus of claim 7, wherein the second subband comprises a downlink portion of the second channel.

10. The apparatus of claim 1, wherein the instructions to transmit the signaling are executable by the processor to cause the apparatus to:
    transmit the request to perform the interference mitigation action that is that the second network entity is to apply an interference mitigation guard band between communications in the second channel and a frequency of the first channel.

11. The apparatus of claim 10, wherein the interference mitigation guard band is associated with a first guard bandwidth that is larger than a second guard bandwidth of a guard band that is used for communications that are not subject to the interference mitigation action.

12. The apparatus of claim 1, wherein the first communication is an uplink communication to be transmitted by the first UE to the first network entity and the second communication is a downlink communication to be transmitted by the second network entity to the second UE based at least in part on either the first network entity or the second network entity operating in the full-duplex mode.

13. The apparatus of claim 1, wherein either the first network entity or the second network entity is operating in a subband full-duplex mode and the first communication on an uplink subband of the first channel is subject to interference by the second communication on a downlink subband of the second channel based at least in part on either the first network entity or the second network entity operating in the subband full-duplex mode.

14. The apparatus of claim 1, wherein the instructions to transmit the signaling are executable by the processor to cause the apparatus to:
transmit, to a central unit, the signaling including the request.

15. The apparatus of claim 1, wherein the instructions to receive the indication are executable by the processor to cause the apparatus to:
receive, from a central unit, the signaling including the indication.

16. The apparatus of claim 1, wherein the instructions to receive the indication are executable by the processor to cause the apparatus to:
receive, from a central unit, signaling that indicates the interference mitigation action.

17. The apparatus of claim 1, wherein the instructions are further executable by the processor to cause the apparatus to:
transmit to the second network entity, an indication of the interference mitigation action that the second network entity is to perform.

18. An apparatus for wireless communication at a first network entity, comprising:
a processor; and
a memory coupled with the processor, with instructions stored in the memory, the instructions being executable by the processor to cause the apparatus to:
receive, based at least in part on one of the first network entity and a second network entity operating in a full-duplex mode, signaling including a request to perform an interference mitigation action for a first communication with a first user equipment (UE) in a first channel during one or more transmission time intervals, wherein the first channel is adjacent to or overlaps with a second channel that is used by the second network entity for a second communication with a second UE, wherein the request comprises an indication of an increased guard band value to be applied by the first network entity for the interference mitigation action; and
communicate with the first UE in the first channel during the one or more transmission time intervals based at least in part on receiving the signaling including the request to perform the interference mitigation action.

19. The apparatus of claim 18, wherein the instructions to receive the signaling are executable by the processor to cause the apparatus to:
receive an indication that the second network entity is to receive the second communication that is associated with a high priority during the one or more transmission time intervals, wherein the first network entity performs the interference mitigation action based at least in part on the second communication being associated with the high priority.

20. The apparatus of claim 18, wherein the instructions to receive the signaling are executable by the processor to cause the apparatus to:
receive an indication of a power backoff value to be applied to the interference mitigation action.

21. The apparatus of claim 18, wherein the instructions to communicate with the first UE are executable by the processor to cause the apparatus to:
refrain from transmitting on a first subband of the first channel that at least partially overlaps with a second subband of the second channel in accordance with the interference mitigation action.

22. The apparatus of claim 18, wherein the instructions to communicate with the first UE are executable by the processor to cause the apparatus to:
transmit the first communication on a first subband of the first channel with a reduced downlink transmission power in accordance with the interference mitigation action, wherein the first subband at least partially overlaps with a second subband of the second channel that is to be used for the second communication.

23. The apparatus of claim 18, wherein the instructions to communicate with the first UE are executable by the processor to cause the apparatus to:
apply an interference mitigation guard band between the first communication in the first channel and a frequency of the second channel.

24. The apparatus of claim 18, wherein the first communication is a downlink communication to be transmitted by the first network entity and the second communication is an uplink communication to be transmitted by the second UE to the second network entity based at least in part on either the first network entity or the second network entity operating in the full-duplex mode.

25. The apparatus of claim 18, wherein either the first network entity or the second network entity is operating in a subband full-duplex mode and the second communication is to be transmitted on an uplink bandwidth part of the second channel that is subject to interference by the second communication to be transmitted on a downlink bandwidth part of the first channel based at least in part on either the first network entity or the second network entity operating in the subband full-duplex mode.

26. The apparatus of claim 18, wherein the instructions to receive the signaling are executable by the processor to cause the apparatus to:
receive, from a central unit, the signaling including the request to perform the interference mitigation action.

27. The apparatus of claim 18, wherein the instructions are further executable by the processor to cause the apparatus to:
receive, from a central unit, a configuration for the interference mitigation action, wherein the interference mitigation action is performed based at least in part on the configuration.

28. The apparatus of claim 18, wherein the instructions are further executable by the processor to cause the apparatus to:
receive, from the first network entity, an indication of the interference mitigation action.

29. A method for wireless communication at a first network entity comprising:
receiving, based at least in part on at least one of the first network entity and a second network entity operating in a full-duplex mode, an indication that a first communication with a first user equipment (UE) by the first network entity in a first channel is subject to interference by a second communication by the second network entity with a second UE in a second channel that is adjacent to or overlaps with the first channel in a frequency domain;
transmitting, in response to receiving the indication, signaling including a request that the second network entity is to perform an interference mitigation action for the second communication with the second UE during one or more transmission time intervals, wherein the request comprises an indication of an increased guard band value to be applied by the second network entity for the interference mitigation action; and communicating with the first UE during the one or more transmission time intervals based at least in part on transmitting the signaling including the request.

30. A method for wireless communication a first network entity, comprising:

receiving, based at least in part on one of the first network entity and a second network entity operating in a full-duplex mode, signaling including a request to perform an interference mitigation action for a first communication with a first user equipment (UE) in a first channel during one or more transmission time intervals, wherein the first channel is adjacent to or overlaps with a second channel that is used by the second network entity for a second communication with a second UE, wherein the request comprises an indication of an increased guard band value to be applied by the first network entity for the interference mitigation action; and communicating with the first UE in the first channel during the one or more transmission time intervals based at least in part on receiving the signaling including the request to perform the interference mitigation action.

* * * * *